US010068582B2

(12) United States Patent
Yasura

(10) Patent No.: US 10,068,582 B2
(45) Date of Patent: Sep. 4, 2018

(54) DIGITAL AUDIO PROCESSING APPARATUS, DIGITAL AUDIO PROCESSING METHOD, AND DIGITAL AUDIO PROCESSING PROGRAM

(71) Applicant: JVC KENWOOD Corporation, Yokohama-shi, Kanagawa (JP)

(72) Inventor: Sadahiro Yasura, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/492,299

(22) Filed: Apr. 20, 2017

(65) Prior Publication Data

US 2017/0236525 A1 Aug. 17, 2017

Related U.S. Application Data

(63) Continuation of application No. PCT/JP2015/075284, filed on Sep. 7, 2015.

(30) Foreign Application Priority Data

Oct. 23, 2014 (JP) ................................ 2014-215912
Jun. 29, 2015 (JP) ................................ 2015-129580

(51) Int. Cl.
*G06F 17/00* (2006.01)
*G10L 19/24* (2013.01)
(Continued)

(52) U.S. Cl.
CPC .......... *G10L 19/24* (2013.01); *G10L 21/0332* (2013.01); *G10L 21/0388* (2013.01)

(58) Field of Classification Search
CPC ...................................................... G06F 17/00
See application file for complete search history.

(56) References Cited

U.S. PATENT DOCUMENTS 5,367,212 A * 11/1994 Rabii .................. H04N 3/2335 315/370
2003/0236584 A1* 12/2003 Kuwaoka ............... G10L 19/02 700/94

(Continued)

FOREIGN PATENT DOCUMENTS

JP H11126097 A 5/1999
JP 20022169597 A 6/2002
JP 2002189498 A 7/2002

OTHER PUBLICATIONS

PCT ISA 237 Form dated Nov. 24, 2015 corresponding to International application No. PCT/JP2015/075284.

(Continued)

*Primary Examiner* — Shreyans A Patel
(74) *Attorney, Agent, or Firm* — Nath, Goldberg & Meyer; Jerald L. Meyer

(57) ABSTRACT

A waveform correction processor corrects the waveform of a first digital audio signal (a CD signal, for example) having a first sampling frequency. A bit depth and sampling frequency converter converts the first digital audio signal with the waveform corrected by the first waveform correction processor to a second digital audio signal (a high-resolution digital audio signal, for example) having a second sampling frequency, which is higher than the first sampling frequency. The waveform correction processor corrects the waveform of the second digital audio signal.

9 Claims, 19 Drawing Sheets

(51) Int. Cl.
*G10L 21/0332* (2013.01)
*G10L 21/0388* (2013.01)

(56) References Cited

U.S. PATENT DOCUMENTS

| | | | | |
|---|---|---|---|---|
| 2006/0076480 | A1* | 4/2006 | Kiriyama | G01D 5/24452 250/231.16 |
| 2008/0082189 | A1* | 4/2008 | Kuwaoka | G10L 19/26 700/94 |
| 2008/0181338 | A1* | 7/2008 | Aono | H03D 1/00 375/340 |
| 2009/0132192 | A1* | 5/2009 | Seo | G01D 3/028 702/94 |
| 2010/0010649 | A1* | 1/2010 | Ooue | G11B 20/10527 700/94 |
| 2010/0074091 | A1* | 3/2010 | Sasaki | G11B 7/005 369/124.01 |

OTHER PUBLICATIONS

Extended European Search Report dated Jun. 26, 2017 corresponding to application No. 15851770.6-1914.

* cited by examiner

FIG. 5

| INTERVAL BETWEEN LOCAL MAXIMUM AND MINIMUM | LEVEL SELECTION SIGNAL | CORRECTION VALUE |
|---|---|---|
| 2 SAMPLES | 00 | 1/2 OF LEVEL DIFFERENCES BETWEEN ADJACENT SAMPLES |
| | 01 | 1/4 OF LEVEL DIFFERENCES BETWEEN ADJACENT SAMPLES |
| | 10 | 1/8 OF LEVEL DIFFERENCES BETWEEN ADJACENT SAMPLES |
| | 11 | 1/16 OF LEVEL DIFFERENCES BETWEEN ADJACENT SAMPLES |
| 3 SAMPLES | 00 | 1/2 OF LEVEL DIFFERENCES BETWEEN ADJACENT SAMPLES |
| | 01 | 1/4 OF LEVEL DIFFERENCES BETWEEN ADJACENT SAMPLES |
| | 10 | 1/8 OF LEVEL DIFFERENCES BETWEEN ADJACENT SAMPLES |
| | 11 | 1/16 OF LEVEL DIFFERENCES BETWEEN ADJACENT SAMPLES |
| 4 SAMPLES | 00 | 1/4 OF LEVEL DIFFERENCES BETWEEN ADJACENT SAMPLES |
| | 01 | 1/8 OF LEVEL DIFFERENCES BETWEEN ADJACENT SAMPLES |
| | 10 | 1/16 OF LEVEL DIFFERENCES BETWEEN ADJACENT SAMPLES |
| | 11 | 1/32 OF LEVEL DIFFERENCES BETWEEN ADJACENT SAMPLES |
| 5 SAMPLES | 00 | 1/4 OF LEVEL DIFFERENCES BETWEEN ADJACENT SAMPLES |
| | 01 | 1/8 OF LEVEL DIFFERENCES BETWEEN ADJACENT SAMPLES |
| | 10 | 1/16 OF LEVEL DIFFERENCES BETWEEN ADJACENT SAMPLES |
| | 11 | 1/32 OF LEVEL DIFFERENCES BETWEEN ADJACENT SAMPLES |
| 6 SAMPLES | 00 | 1/8 OF LEVEL DIFFERENCES BETWEEN ADJACENT SAMPLES |
| | 01 | 1/16 OF LEVEL DIFFERENCES BETWEEN ADJACENT SAMPLES |
| | 10 | 1/32 OF LEVEL DIFFERENCES BETWEEN ADJACENT SAMPLES |
| | 11 | 1/64 OF LEVEL DIFFERENCES BETWEEN ADJACENT SAMPLES |
| 7 SAMPLES | 00 | 1/8 OF LEVEL DIFFERENCES BETWEEN ADJACENT SAMPLES |
| | 01 | 1/16 OF LEVEL DIFFERENCES BETWEEN ADJACENT SAMPLES |
| | 10 | 1/32 OF LEVEL DIFFERENCES BETWEEN ADJACENT SAMPLES |
| | 11 | 1/64 OF LEVEL DIFFERENCES BETWEEN ADJACENT SAMPLES |
| 8 SAMPLES | 00 | 1/16 OF LEVEL DIFFERENCES BETWEEN ADJACENT SAMPLES |
| | 01 | 1/32 OF LEVEL DIFFERENCES BETWEEN ADJACENT SAMPLES |
| | 10 | 1/64 OF LEVEL DIFFERENCES BETWEEN ADJACENT SAMPLES |
| | 11 | 1/128 OF LEVEL DIFFERENCES BETWEEN ADJACENT SAMPLES |
| ⋮ | ⋮ | ⋮ |

DIGITAL AUDIO PROCESSING APPARATUS, DIGITAL AUDIO PROCESSING METHOD, AND DIGITAL AUDIO PROCESSING PROGRAM

CROSS REFERENCE TO RELATED APPLICATION

This application is a Continuation of PCT Application No. PCT/JP2015/075284, filed on Sep. 7, 2015, and claims the priority of Japanese Patent Application No. 2014-215912, filed on Oct. 23, 2014, and No. 2015-129580, filed on Jun. 29, 2015, the entire contents of all of which are incorporated herein by reference.

BACKGROUND

The present disclosure relates to a digital audio processing apparatus, a digital audio processing method, and a digital audio processing program to process a digital audio signal.

High-resolution digital audio signals (hereinafter, referred to as high-resolution audio signals) have appeared and attracted attention in recent years. The high-resolution audio signals have a higher sound quality than digital audio signals (hereinafter, referred to as CD audio signals) recorded in compact discs (CDs).

CD audio signals are signals obtained by converting analog audio signals to digital audio signals with a sampling bit depth of 16 bits and a sampling frequency of 44.1 kHz. In CD audio signals, the frequency band is limited to 22.05 kHz.

On the other hand, the sampling bit depth of high-resolution audio signals is higher than that of CD audio signals, or the sampling frequency of high-resolution audio signals is higher. When the sampling bit depth and sampling frequency are respectively 24 bits and 176.4 kHz, for example, the frequency band is 88.2 kHz. High-resolution audio signals are capable of reproducing minute changes in sound that cannot be reproduced by CD audio signals, providing higher quality sound than CD audio signals.

However, most music studios have only master audio sources (called CD masters) having a format in which the sampling bit depth is 16 bits and the sampling frequency is 44.1 kHz. CD audio signals of such a CD master are subjected to bit depth conversion and sampling frequency conversion to be converted into high-resolution audio signals.

SUMMARY

Digital audio signals obtained by converting CD audio signals to high-resolution audio signals provide high quality sound than CD audio signals. However, it is required to further improve the sound quality in terms of auditory perception.

A first aspect of the embodiments provides a digital audio processing apparatus, including: a first waveform correction processor configured to correct the waveform of a first digital audio signal having a first sampling frequency; a sampling frequency converter configured to convert the first digital audio signal with the waveform corrected by the first waveform correction processor, to a second digital audio signal having a second sampling frequency which is higher than the first sampling frequency; and a second waveform correction processor configured to correct the waveform of the second digital audio signal.

The first waveform correction processor includes: a first local extremum calculator configured, based on samples of the first digital audio signal, to calculate samples of local maximum and minimum adjacent to each other; a first number-of-sample detector configured to detect the number of samples between the adjacent samples of the local maximum and minimum; a first difference calculator configured to calculate level differences between adjacent samples in the samples constituting the first digital audio signal; a first correction value calculator configured to calculate correction values by multiplying by a predetermined coefficient, the differences calculated by the first difference calculator; and a first adder/subtractor configured to add the correction values calculated by the first correction value calculator, among the samples constituting the first digital audio signal, to at least the samples preceding and following the sample of the local maximum calculated by the first local extremum calculator, and to subtract the correction values calculated by the first correction value calculator from at least the samples preceding and following the sample of the local minimum calculated by the first local extremum calculator.

The second waveform correction processor includes: a second local extremum calculator configured to calculate samples of local maximum and minimum based on samples constituting the second digital audio signal outputted from the sampling frequency converter; a second number-of-sample detector configured to detect the number of samples between the samples of the local maximum and minimum adjacent to each other; a second difference calculator configured to calculate level differences between adjacent samples in the samples constituting the second digital audio signal; a second correction value calculator configured to calculate correction values by multiplying by a predetermined coefficient, the differences calculated by the second difference calculator; and a second adder/subtractor configured to add the correction values calculated by the second correction value calculator, among the samples constituting the second digital audio signal, to at least the samples preceding and following the sample of the local maximum calculated by the second local extremum calculator, and to subtract the correction values calculated by the second correction value calculator from at least the samples preceding and following the sample of the local minimum calculated by the second local extremum calculator.

A second aspect of the embodiments provides a digital audio processing method, including: a first local extremum calculation step of calculating samples of local maximum and minimum based on samples of a first digital audio signal having a first sampling frequency; a first number-of-sample detection step of detecting the number of samples between the adjacent samples of the local maximum and minimum; a first difference calculation step of calculating level differences between adjacent samples in the samples constituting the first digital audio signal; a first correction value calculation step of calculating correction values by multiplying by a predetermined coefficient the differences calculated in the first difference calculation step; a first addition and subtraction step of adding the correction values calculated in the first correction value calculation step, among the samples constituting the first digital audio signal, to at least the samples preceding and following the sample of the local maximum calculated in the first local extremum calculation step, and subtracting the correction values calculated in the first correction value calculation step from at least the samples preceding and following the sample of the local minimum calculated in the first local extremum calculation step; a sampling frequency conversion step of converting the first digital audio signal with the waveform corrected in the first addition and subtraction step to a second digital audio signal having a second sampling frequency which is higher than the first sampling frequency; a second local extremum calculation step of calculating samples of local maximum and minimum based on samples constituting the second digital audio signal; a second number-of-sample detection step of detecting the number of samples between the adjacent samples of the local maximum and minimum in the samples constituting the second digital audio signal; a second difference calculation step of calculating level differences between adjacent samples in the samples constituting the second digital audio signal; a second correction value calculation step of calculating correction values by multiplying by a predetermined coefficient, the level differences calculated in the second difference calculation step; and a second addition and subtraction step of adding the correction values calculated in the second correction value calculation step, among the samples constituting the second digital audio signal, to at least the samples preceding and following the sample of the local maximum calculated in the second local extremum calculation step, and subtracting the correction values calculated in the second correction value calculation step from at least the samples preceding and following the sample of the local minimum calculated in the second local extremum calculation step.

A third aspect of the embodiments provides a digital audio processing program, causing a computer to execute: a first local extremum calculation step of calculating samples of local maximum and minimum based on samples of a first digital audio signal having a first sampling frequency; a first number-of-sample detection step of detecting the number of samples between the adjacent samples of the local maximum and minimum; a first difference calculation step of calculating level differences between adjacent samples in the samples constituting the first digital audio signal; a first correction value calculation step of calculating correction values by multiplying by a predetermined coefficient the differences calculated in the first difference calculation step; a first addition and subtraction step of adding the correction values calculated in the first correction value calculation step, among the samples constituting the first digital audio signal, to at least the samples preceding and following the sample of the local maximum calculated in the first local extremum calculation step, and subtracting the correction values calculated in the first correction value calculation step from at least the samples preceding and following the sample of the local minimum calculated in the first local extremum calculation step; a sampling frequency conversion step of converting the first digital audio signal with the waveform corrected in the first addition and subtraction step to a second digital audio signal having a second sampling frequency which is higher than the first sampling frequency; a second local extremum calculation step of calculating samples of local maximum and minimum based on samples constituting the second digital audio signal; a second number-of-sample detection step of detecting the number of samples between the adjacent samples of the local maximum and minimum in the samples constituting the second digital audio signal; a second difference calculation step of calculating level differences between adjacent samples in the samples constituting the second digital audio signal; a second correction value calculation step of calculating correction values by multiplying by a predetermined coefficient, the level differences calculated in the second difference calculation step; and a second addition and subtraction step of adding the correction values calculated in the second correction value calculation step, among the samples constituting the second digital audio signal, to at least the samples preceding and following the sample of the local maximum calculated in the second local extremum calculation step, and subtracting the correction values calculated in the second correction value calculation step from at least the samples preceding and following the sample of the local minimum calculated in the second local extremum calculation step.

A fourth aspect of the embodiments provides a digital audio processing apparatus, which is configured, as a target digital audio signal, to process a digital audio signal obtained by converting a first digital audio signal having a first sampling frequency to a second digital audio signal having a second sampling frequency that is higher than the first sampling frequency, the apparatus including: a first waveform correction processor configured to correct the waveform of the target digital audio signal; and a second waveform correction processor configured to correct the waveform of the target digital audio signal with the waveform corrected by the first waveform correction processor.

The first waveform correction processor includes: a first local extremum calculator configured, to extract samples taken at sample intervals of the first digital audio signal from samples constituting the target digital audio signal, and to calculate samples of local maximum and minimum based on the extracted samples; a first number-of-sample detector configured to detect the number of samples between the samples of the local maximum and minimum adjacent to each other; a first difference calculator configured to calculate level differences between adjacent samples in the samples constituting the target digital audio signal; a first correction value calculator configured to calculate correction values by multiplying by a predetermined coefficient, the level differences calculated by the first difference calculator; and a first adder/subtractor configured to add the correction values calculated by the first correction value calculator, among the samples constituting the target digital audio signal, to at least the samples from the sample preceding the sample of the local maximum calculated by the first local extremum calculator to the sample which precedes the sample of the local maximum and is separated from the sample of the local maximum by a one sample interval of the first digital audio signal and the samples from the sample following the sample of the local maximum calculated by the first local extremum calculator to the sample which follows the sample of the local maximum and is separated from the sample of the local maximum by a one sample interval of the first digital audio signal, and to subtract the correction values calculated by the first correction value calculator from at least the samples from the sample preceding the sample of the local minimum calculated by the first local extremum calculator to the sample which precedes the sample of the local minimum and is separated from the local minimum by a one sample interval of the first digital audio signal and the samples from the sample following the sample of the local minimum calculated by the first local extremum calculator to the sample which follows the sample of the local minimum and is separated from the sample of the local minimum by a one sample interval of the first digital audio signal.

The second waveform correction processor includes: a second local extremum calculator configured to calculate samples of local maximum and minimum based on samples constituting the target digital audio signal outputted from the first waveform correction processor; a second number-of-sample detector configured to detect the number of samples between the samples of the local maximum and minimum adjacent to each other; a second difference calculator configured to calculate level differences between adjacent samples in the samples constituting the target digital audio signal; a second correction value calculator configured to calculate correction values by multiplying by a predetermined coefficient, the level differences calculated by the second difference calculator; and a second adder/subtractor configured, to add the correction values calculated by the second correction value calculator, among the samples constituting the target digital audio signal, to at least the samples preceding and following the sample of the local maximum calculated by the second local extremum calculator, and to subtract the correction values calculated by the second correction value calculator from at least the samples preceding and following the sample of the local minimum calculated by the second local extremum calculator.

A fifth aspect of the embodiments provides a digital audio processing method, which is configured, as a target digital audio signal, to process a digital audio signal obtained by converting a first digital audio signal having a first sampling frequency to a second digital audio signal having a second sampling frequency that is higher than the first sampling frequency, the method including: an extraction step of extracting samples at sample intervals of the first digital audio signal from samples constituting the target digital audio signal; a first local extremum calculation step of calculating samples of local maximum and minimum based on the samples extracted in the extraction step; a first number-of-sample detection step of detecting the number of samples between the samples of the local maximum and minimum adjacent to each other; a first difference calculation step of calculating level differences between adjacent samples in the samples constituting the target digital audio signal; a first correction value calculation step of calculating correction values by multiplying by a predetermined coefficient the level differences calculated in the first difference calculation step; a first addition and subtraction step of adding the correction values calculated in the first correction value calculation step, among the samples constituting the target digital audio signal, to at least the samples from the sample preceding the sample of the local maximum calculated in the first local extremum calculation step to the sample which precedes the sample of the local maximum and is separated from the sample of the local maximum by a one sample interval of the first digital audio signal and the samples from the sample following the sample of the local maximum calculated in the first local extremum calculation step to the sample which follows the sample of the local maximum and is separated from the sample of the local maximum by a one sample interval of the first digital audio signal, and to subtract the correction values calculated in the first correction value calculation step from at least the samples from the sample preceding the sample of the local minimum calculated in the first local extremum calculation step to the sample which precedes the sample of the local minimum and is separated from the local minimum by a one sample interval of the first digital audio signal and the samples from the sample following the sample of the local minimum calculated in the first local extremum calculation step to the sample which follows the sample of the local minimum and is separated from the sample of the local minimum by a one sample interval of the first digital audio signal; a second local extremum calculation step of calculating samples of local maximum and minimum based on samples constituting the target digital audio signal subjected to addition and subtraction in the first addition and subtraction step; a second number-of-sample detection step of detecting the number of samples between the samples of the local maximum and minimum adjacent to each other; a second difference calculation step of calculating level differences between adjacent samples in the samples constituting the target digital audio signal; a second correction value calculation step of calculating correction values by multiplying by a predetermined coefficient, the differences calculated in the second difference calculation step; and a second addition and subtraction step of adding the correction values calculated in the second correction value calculation step, among the samples constituting the target digital audio signal, to at least the samples preceding and following the sample of the local maximum calculated in the second local extremum calculation step and subtracting the correction values calculated in the second correction value calculation step from at least the samples preceding and following the sample of the local minimum calculated in the second local extremum calculation step.

A sixth aspect of the embodiments provides a digital audio processing program, which is configured to process, as a target digital audio signal, a digital audio signal obtained by converting a first digital audio signal having a first sampling frequency to a second digital audio signal having a second sampling frequency that is higher than the first sampling frequency, the program causing a computer to execute: an extraction step of extracting samples at sample intervals of the first digital audio signal from samples constituting the target digital audio signal; a first local extremum calculation step of calculating samples of local maximum and minimum based on the samples extracted in the extraction step; a first number-of-sample detection step of detecting the number of samples between the samples of the local maximum and minimum adjacent to each other; a first difference calculation step of calculating level differences between adjacent samples in the samples constituting the target digital audio signal; a first correction value calculation step of calculating correction values by multiplying by a predetermined coefficient, the level differences calculated in the first difference calculation step; a first addition and subtraction step of adding the correction values calculated in the first correction value calculation step, among the samples constituting the target digital audio signal, to at least the samples from the sample preceding the sample of the local maximum calculated in the first local extremum calculation step to the sample which precedes the sample of the local maximum and is separated from the sample of the local maximum by a one sample interval of the first digital audio signal and the samples from the sample following the sample of the local maximum calculated in the first local extremum calculation step to the sample which follows the sample of the local maximum and is separated from the sample of the local maximum by a one sample interval of the first digital audio signal, and to subtract the correction values calculated in the first correction value calculation step from at least the samples from the sample preceding the sample of the local minimum calculated in the first local extremum calculation step to the sample which precedes the sample of the local minimum and is separated from the local minimum by a one sample interval of the first digital audio signal and the samples from the sample following the sample of the local minimum calculated in the first local extremum calculation step to the sample which follows the sample of the local minimum and is separated from the sample of the local minimum by a one sample interval of the first digital audio signal; a second local extremum calculation step of calculating samples of local maximum and minimum based on samples constituting the target digital audio signal subjected to addition and subtraction in the first addition and subtraction step; a second number-of-sample detection step of detecting the number of samples between the samples of the local maximum and minimum adjacent to each other; a second difference calculation step of calculating level differences between adjacent samples in the samples constituting the target digital audio signal; a second correction value calculation step of calculating correction values by multiplying by a predetermined coefficient, the differences calculated in the second difference calculation step; and a second addition and subtraction step of adding the correction values calculated in the second correction value calculation step, among the samples constituting the target digital audio signal, to at least the samples preceding and following the sample of the local maximum calculated in the second local extremum calculation step and subtracting the correction values calculated in the second correction value calculation step from at least the samples preceding and following the sample of the local minimum calculated in the second local extremum calculation step.

BRIEF DESCRIPTION OF THE DRAWINGS

FIG. 5 is a diagram illustrating an example of a table of correction values set for each number of samples between the local maximum and minimum.

DETAILED DESCRIPTION

First Embodiment

A description is given of a digital audio processing apparatus, a digital audio processing method, and a digital audio processing program according to the first embodiment, with reference to the accompanying drawings.

In the first embodiment, the processing target is a digital audio signal obtained by converting a first digital audio signal having a first sampling frequency to a second digital audio signal having a second sampling frequency that is higher than the first sampling frequency.

The first digital audio signal is a CD audio signal, for example, and the second digital audio signal is a high-resolution audio signal. In the example described in the first embodiment, the high-resolution audio signal is a digital audio signal which is obtained by converting a CD audio signal having a sampling bit depth of 16 bits and a sampling frequency of 44.1 kHz, and has a sampling bit depth of 24 bits and a sampling frequency of 176.4 kHz.

The first and second digital audio signals are not limited to the aforementioned examples. The second digital audio signal may be a digital audio signal which is obtained by converting an audio signal with a sampling bit depth of 16 bits and a sampling frequency of 48 kHz as the first digital audio signal, and has a sampling bit depth of 24 bits and a sampling frequency of 192 kHz. The second digital audio signal may be a digital audio signal which is obtained by converting an audio signal with a sampling bit depth of 24 bits and a sampling frequency of 96 kHz as the first digital audio signal, and has a sampling bit depth of 24 bits and a sampling frequency of 192 kHz.

Figure 1:
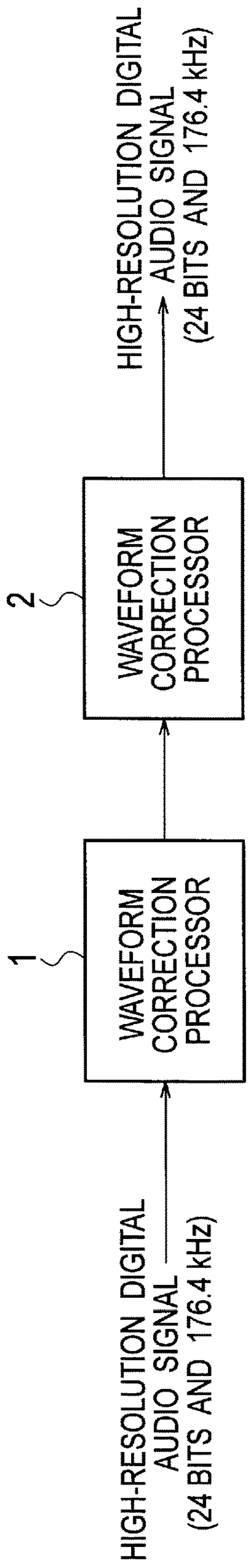
FIG. 1 is a block diagram illustrating the entire configuration of a digital audio processing apparatus according to the first embodiment.

In FIG. 1, the high-resolution audio signal is inputted to a waveform correction processor 1 to be subjected to a waveform correction process described later. The high-resolution audio signal outputted from the waveform correction processor 1 is inputted to a waveform correction processor 2 to be subjected to a waveform correction process described later.

The high-resolution audio signal inputted to the waveform correction processor 1 is an audio signal obtained by converting an audio signal having a sampling frequency that is lower than that of the high-resolution audio signal inputted to the waveform correction processor 1, into the sampling frequency of the high-resolution audio signal.

Figure 2:
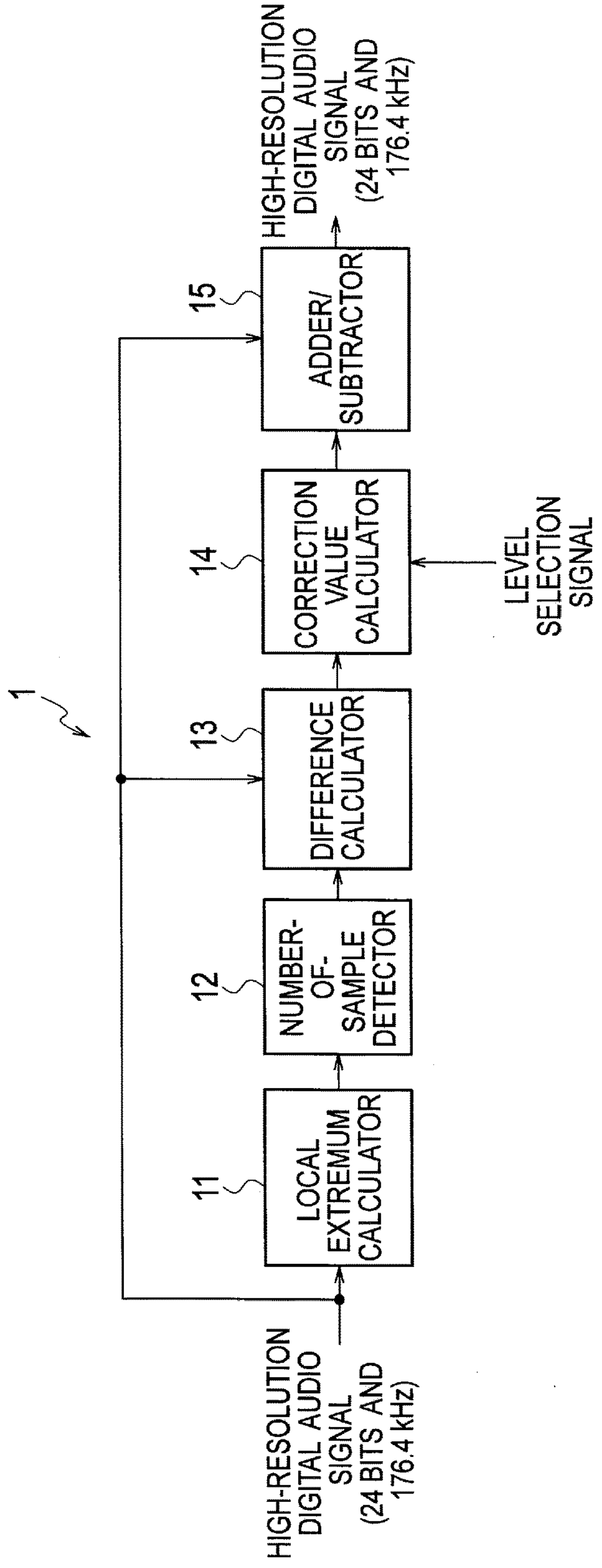
FIG. 2 is a block diagram illustrating a concrete configuration example of a waveform correction processor 1 illustrated in FIG. 1.
Figure 3:
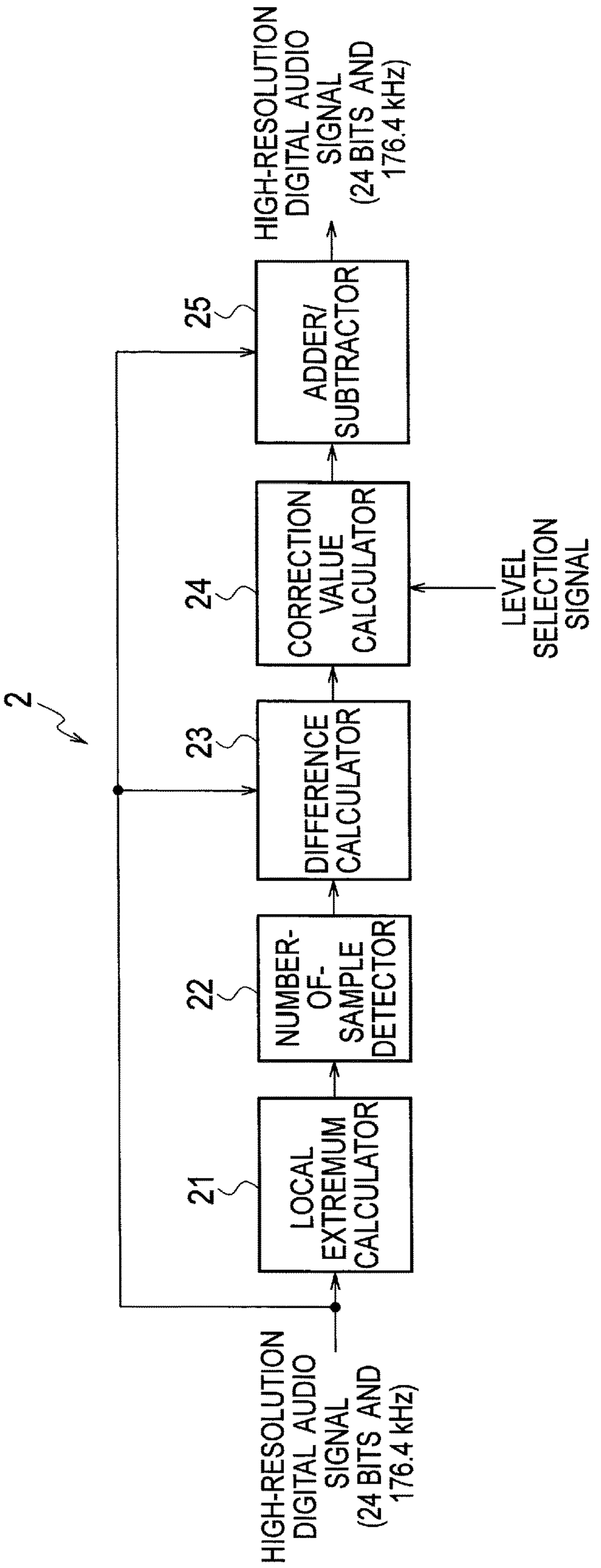
FIG. 3 is a block diagram illustrating a concrete configuration example of a waveform correction processor 2 illustrated in FIG. 1.

As illustrated in FIG. 2, the waveform correction processor 1 includes a local extremum calculator 11, a number-of-sample detector 12, a difference calculator 13, a correction value calculator 14, and an adder/subtractor 15. As illustrated in FIG. 3, the waveform correction processor 2 includes a local extremum calculator 21, a number-of-sample detector 22, a difference calculator 23, a correction value calculator 24, and an adder/subtractor 25.

Each section constituting the waveform correction processors 1 and 2 may be composed of either hardware or software, or may be composed of a combination of hardware and software. Each section constituting the waveform correction processors 1 and 2 may be composed of an integrated circuit, or the entire waveform correction processors 1 and 2 may be individually composed of an integrated circuit.

First, a description is given of an operation of the waveform correction processor 1 illustrated in FIG. 2, with reference to FIGS. 4 to 8.

Figure 4:
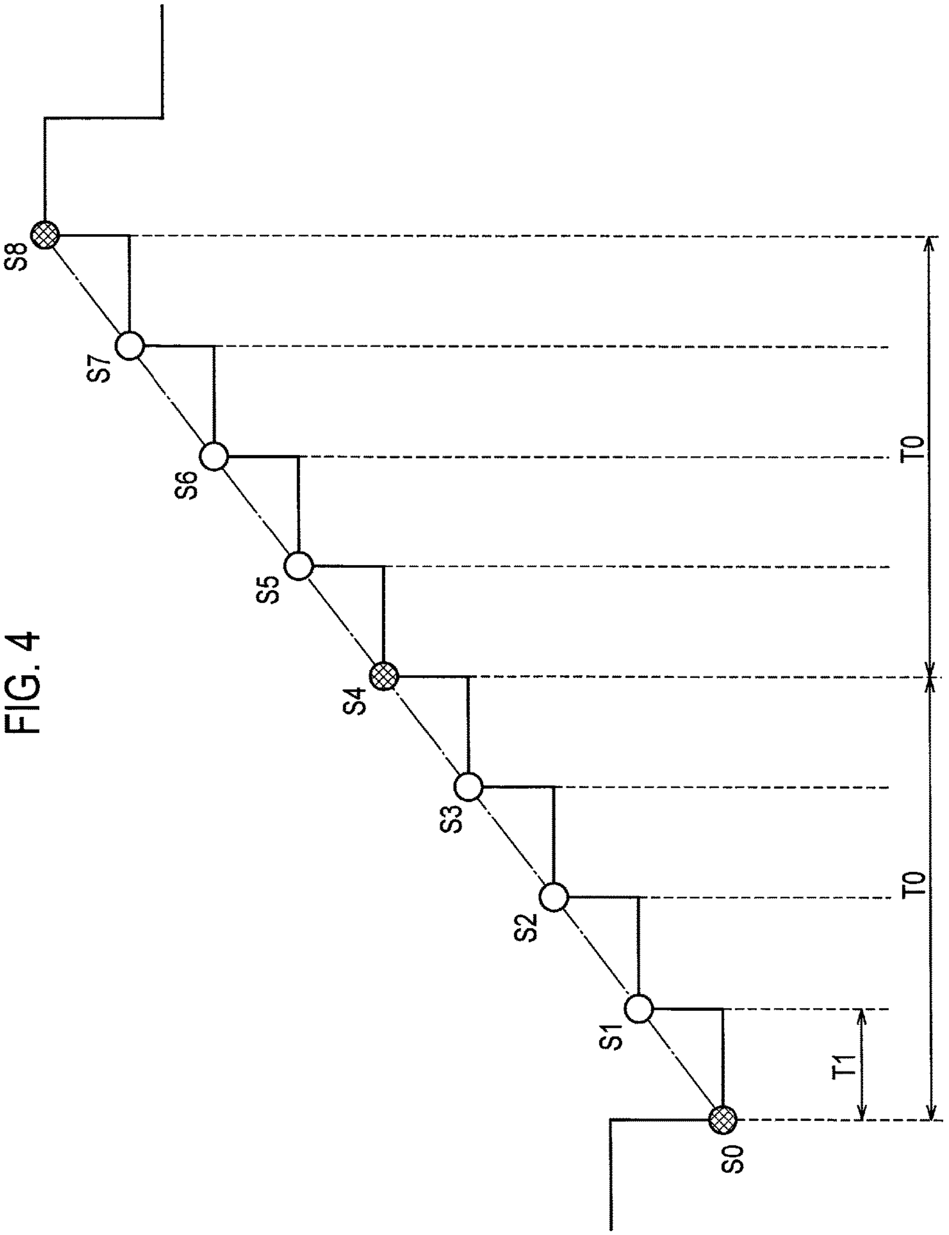
FIG. 4 is a waveform diagram illustrating an example of samples constituting a high resolution digital audio signal to be processed by the digital audio processing apparatus, the method, and the program according to the first embodiment.

FIG. 4 illustrates an example of the waveform of samples constituting the high-resolution audio signal. FIG. 4 illustrates only a part of the waveform where the sample level increases with time. As illustrated in FIG. 4, the high-resolution audio signal includes samples S0 to S8.

The samples S0, S4, and S8 are originally included in the CD audio signal. The samples S1 to S3 and S5 to S7 are added when the sampling frequency of the CD audio signal is quadrupled.

The local extremum calculator 11 extracts samples at sample intervals T0 of the CD audio signal from the samples of the inputted high-resolution audio signal. The local extremum calculator 11 determines the magnitude relationship between adjacent samples to calculate local maximum and minimum.

Since the high-resolution audio signal is a digital audio signal having a sampling frequency four times that of the CD audio signal, the local extremum calculator 11 needs to extract every fourth sample.

The high-resolution audio signal is assumed to be a digital audio signal which is obtained by converting the first digital audio signal, which has the first sampling frequency, to the second digital audio signal having the second sampling signal, which is N (N is a natural number of two or greater) times the first sampling frequency. The local extremum calculator 11 needs to extract a sample every N samples.

In the case of FIG. 4, the local extremum calculator 11 calculates that the samples S0 and S8 are the local minimum and maximum, respectively.

The number-of-sample detector 12 detects the number of samples (sample intervals) between the local maximum and minimum. The number of samples between the local maximum and minimum refers to the number of samples in a part where the sample level increases from the local minimum to maximum as illustrated in FIG. 4, or the number of samples in a part where the sample level decreases from the local maximum to the minimum.

The number of samples detected by the number-of-sample detector 12 is the number of samples extracted by the local extremum calculator 11 at sample intervals T0 of the CD audio signal. In the case of FIG. 4, the number-of-sample detector 12 detects that the interval between the local maximum and minimum corresponds to two samples.

The difference calculator 13 receives the result of detection by the number-of-sample detector 12 and the high-resolution audio signal. The difference calculator 13 calculates level differences between adjacent samples in the high-resolution audio signal. The adjacent samples herein refer to samples adjacent to each other with sample intervals T1 of the high-resolution audio signal.

The correction value calculator 14 calculates correction values by multiplying level differences between adjacent samples by a predetermined coefficient. The coefficient is equal to or less than 1. Coefficients corresponding to each number of samples are set in the correction value calculator 14. The correction value calculator 14 selects a coefficient corresponding to the number of samples detected by the number-of-sample detector 12.

It is preferred that the correction values be adjusted by selecting a coefficient by which the level differences are to be multiplied through a level selection signal inputted to the correction value calculator 14.

The adder/subtractor 15 adds correction values to samples near the local maximum and subtracts correction values from samples near the local minimum. In addition, the adder/subtractor 15 may add a correction value to the local maximum sample and subtract a correction value from the local minimum sample. Herein, the local maximum and minimum samples refer to samples that are of the local maximum and minimum, respectively. The meaning of "near the local maximum sample" is described later.

Herein, with reference to FIG. 5, a description is given of examples of the coefficient by which the correction value calculator 14 multiplies the level differences between adjacent samples. As illustrated in FIG. 5, the correction value calculator 14 includes coefficients corresponding to level selection signals 00, 01, 10, and 11 for the number of samples between the local maximum and minimum (starting from two samples to a predetermined number of samples).

In FIG. 4 where the interval between the local maximum and minimum corresponds to two samples of the CD audio signal, when the level selection signal is 00, the correction value calculator 14 multiplies the level differences between adjacent samples by a coefficient of ½.

With reference to FIGS. 6A, 6B, 7A, and 7B, a description is given of a basic idea of samples near the local maximum and minimum samples which the adder/subtractor 15 adds or subtracts the correction values to or from. The basic idea applies to the addition and subtraction processes at the adder/subtractor 25 illustrated in FIG. 3.

In FIGS. 6A, 6B, 7A, and 7B, Smax and Smin indicate samples that are local maximum and minimum, respectively. S (−1) indicates a sample which precedes the local maximum sample, and S (−2) indicates a sample which precedes the local maximum sample by two samples. S (+1) indicates a sample which follows the local maximum sample, and S (+2) indicates a sample which is two samples following the local maximum sample.

Figure 6A:
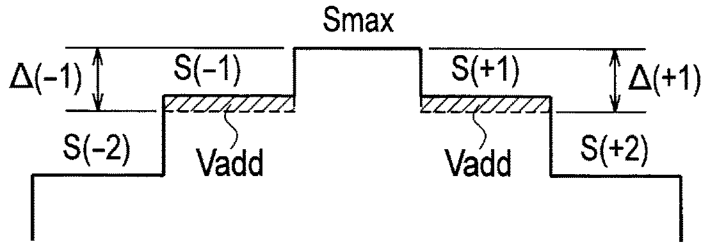
FIGS. 6A and 6B are diagrams for explaining the basic idea of samples near the local maximum and minimum which are subjected to addition and subtraction of correction values by the adder/subtractor illustrated in FIGS. 2 and 3.
Figure 6B:
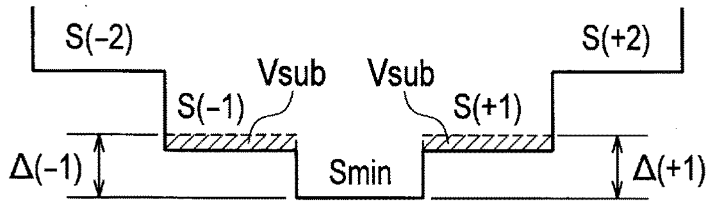
Figure 7A:
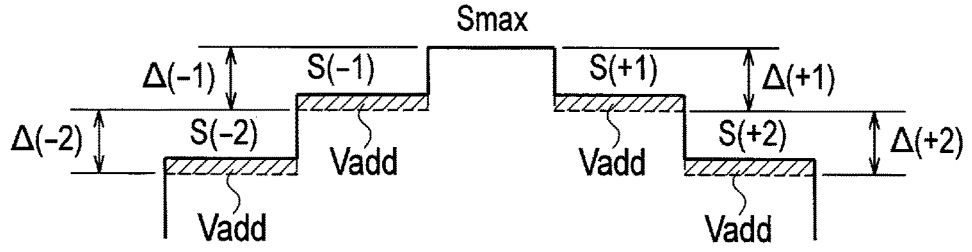
FIGS. 7A and 7B are diagrams for explaining the basic idea of samples near the local maximum and minimum which are subjected to addition and subtraction of correction values by the adder/subtractor illustrated in FIGS. 2 and 3.
Figure 7B:
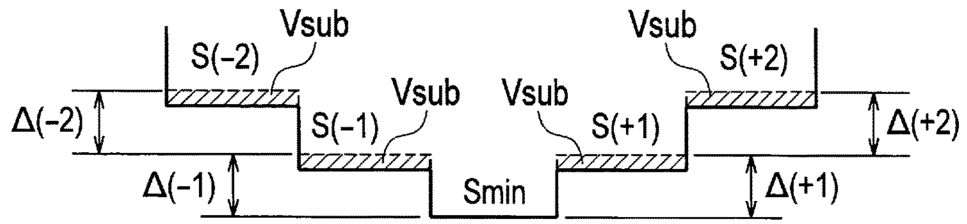

As an example, the adder/subtractor 15 selects the addition and subtraction processes illustrated in FIGS. 6A and 6B, or the addition and subtraction processes illustrated in FIGS. 7A and 7B according to the number of samples between the maximum and minimum.

To be specific, the adder/subtractor 15 performs addition and subtraction processes as follows when the interval between the local maximum and minimum corresponds to two to five samples. As illustrated in FIG. 6A, the adder/subtractor 15 adds the correction values to the samples S (−1) and S (+1), which precedes and follows the local maximum sample Smax, respectively. Herein, the correction values are obtained by multiplying the differences Δ(−1) and Δ(+1) by the coefficient illustrated in FIG. 5.

The difference Δ(−1) is the level difference between the sample Smax and the sample S (−1), which precedes the sample Smax. The difference Δ(+1) is the level difference between the sample Smax and the sample S (+1), which follows the sample Smax.

The hatched sections in FIG. 6A represent the correction values Vadd, which are added to the samples S (−1) and S (+1).

As illustrated in FIG. 6B, the adder/subtractor 15 subtracts from the samples S (−1) and S (+1), which precedes and follows the local minimum sample Smin, respectively, the correction values obtained by multiplying the differences Δ(−1) and Δ(+1) by the coefficient illustrated in FIG. 5.

The hatched sections in FIG. 6B represent the correction values Vsub, which are subtracted from the samples S (−1) and S (+1).

The adder/subtractor 15 performs the addition and subtraction processes as follows when the interval between the local maximum and minimum corresponds to six samples or more. As illustrated in FIG. 7A, the adder/subtractor 15 adds to the samples S (−1) and S (−2), which are consecutive samples preceding the local maximum sample Smax, and S (+1) and S (+2), which are consecutive samples following the local maximum sample Smax, correction values obtained by multiplying the differences Δ(−1), Δ(−2), Δ(+1), and Δ(+2) by the coefficient illustrated in FIG. 5, respectively.

The difference Δ(−2) is the level difference between the samples S (−1), which precedes the sample Smax, and the sample S (−2), which precedes the sample Smax by two samples. The difference Δ(+2) is the level difference between the sample S (+1), which follows the sample Smax, and the sample S (+2), which is two samples that follow the sample Smax.

In a similar manner, the hatched sections in FIG. 7A represent the correction values Vadd, which are added to the samples S (−1), S (−2), S (+1), and S (+2).

As illustrated in FIGS. 7A and 7B, the adder/subtractor 15 subtracts from the samples S (−1) and S (−2), which are consecutive samples preceding the local minimum sample Smin, S (+1) and S (+2), which are consecutive samples following the local minimum sample Smin, correction values obtained by multiplying the differences Δ(−1), Δ(−2), Δ(+1), and Δ(+2) by the coefficient illustrated in FIG. 5, respectively.

In a similar manner, the hatched sections in FIG. 7B represent the correction values Vsub, which are subtracted from the samples S (−1), S (−2), S (+1), and S (+2).

Based on the aforementioned basic idea, the adder/subtractor 15 adds the correction values to the samples near the local maximum sample and subtracts the correction values from the samples near the local minimum sample.

Based on the basic idea illustrated in FIGS. 6A and 6B, when the interval between the local maximum and minimum corresponds to two samples, the intermediate sample between the local maximum and minimum samples is subjected to both the addition and subtraction processes. In order to avoid such a problem, when the interval between the local maximum and minimum corresponds to two samples, the adder/subtractor 15 preferably performs only the addition process for the intermediate sample.

The adder/subtractor 15 may perform only the addition process for the intermediate sample when the sample level increases from the local minimum to maximum as illustrated in FIG. 4, while performing only the subtraction process for the intermediate sample when the sample level decreases from the local maximum to the minimum.

In the first embodiment, the adder/subtractor 15 performs only the addition process for the intermediate sample when the interval between the local maximum and minimum corresponds to two samples.

In the above description, the process for the intervals of two to five samples is different from the process for the interval of six samples or more. This is shown by way of example, and the invention is not limited to such a configuration. Moreover, in some cases, the correction values may be added to the samples which are three or more samples preceding and following the local maximum sample Smax, or may be subtracted from samples which are three or more samples preceding and following the local minimum sample Smin.

The high-resolution audio signal inputted to the adder/subtractor 15 includes the samples S5 to S7 between the local maximum sample S8 and the sample S4, which precedes the sample S8 in terms of the samples of the CD signal, as illustrated in FIG. 4. The adder/subtractor 15 therefore executes the following addition process.

Figure 8:
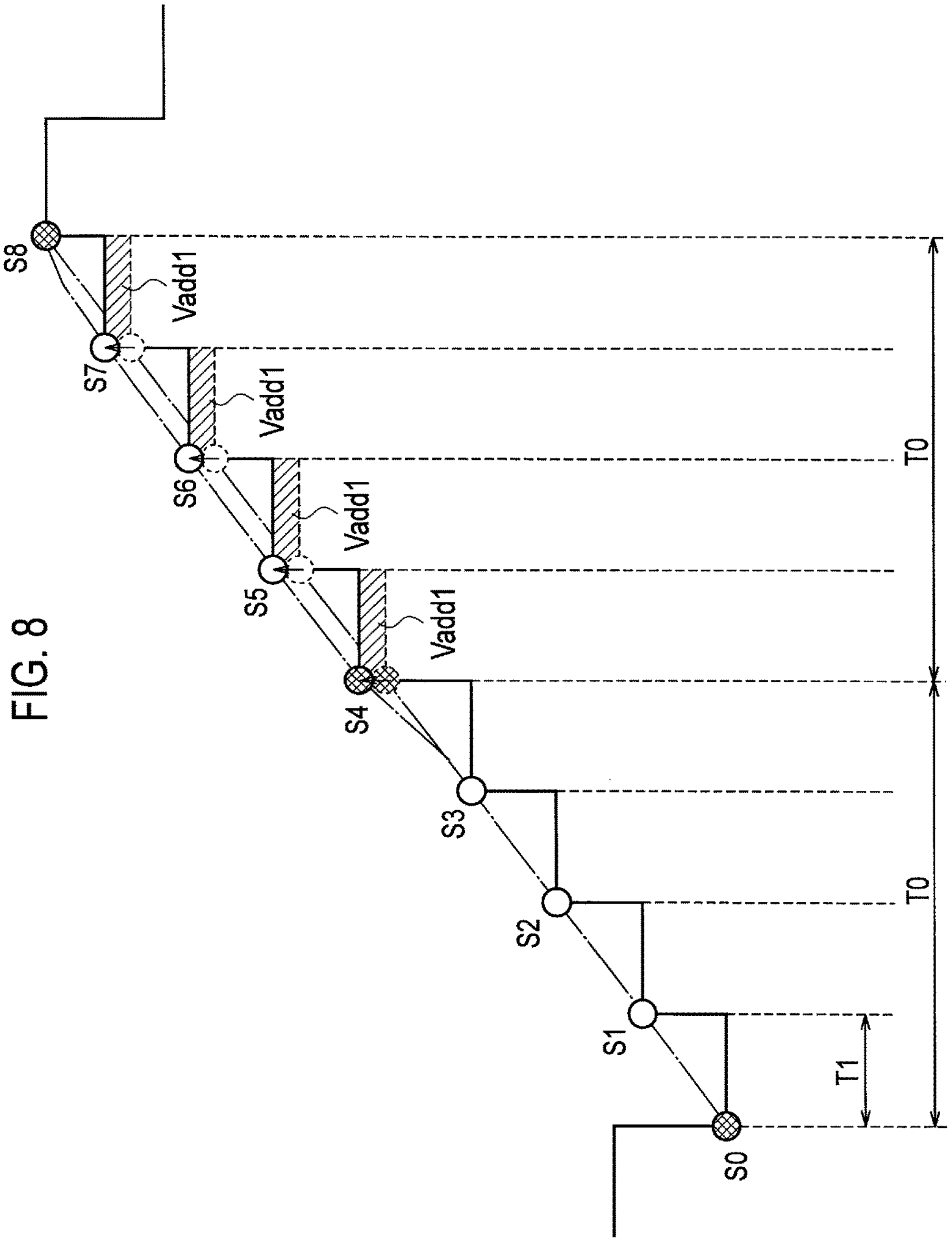
FIG. 8 is a waveform diagram illustrating a result of adding correction values by the waveform correction processor 1 illustrated in FIG. 2.

The correction value calculator 14 multiplies the level difference between the samples S4 and S5, the level difference between the samples S5 and S6, the level difference between the samples S6 and S7, and the level difference between the samples S7 and S8 by the coefficient to calculate the correction values. As illustrated in FIG. 8, the adder/subtractor 15 adds the correction values Vadd1 to the respective samples S4 to S7.

The adder/subtractor 15 may add to the sample S8 of the local maximum the correction value Vadd1, obtained by multiplying the level difference between the samples S7 and S8 by the coefficient.

Adding the correction values Vadd1 to the samples S4 to S7 as illustrated in FIG. 8 is equivalent to adding the correction value Vadd, obtained by multiplying the difference Δ(−1) by the coefficient to the sample S (−1), which precedes the local maximum sample Smax illustrated in FIG. 6A.

Figure 9:
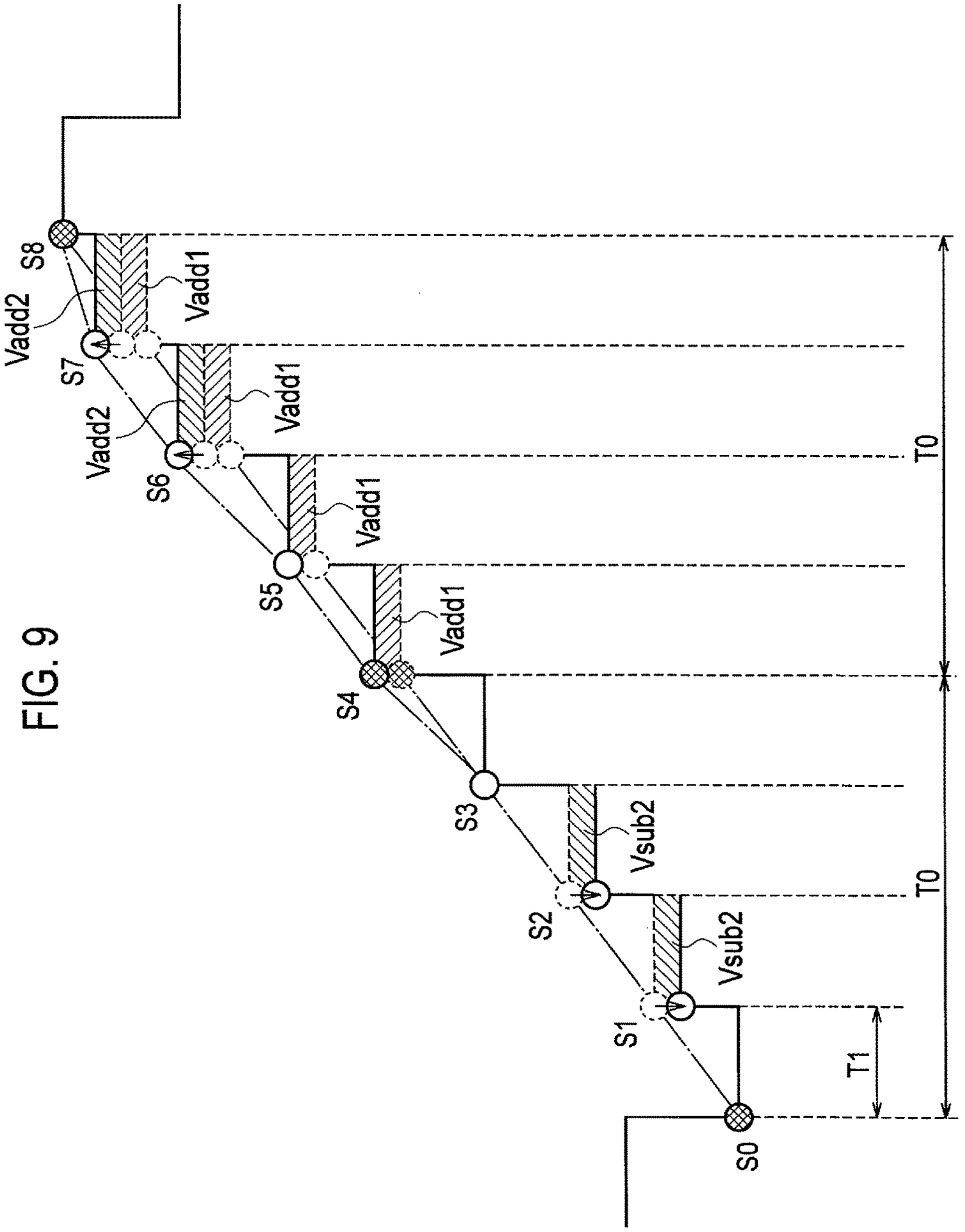
FIG. 9 is a waveform diagram illustrating a result of adding the correction values by the waveform correction processor 2 illustrated in FIG. 2.

Next, a description is given of the operation of the waveform correction processor 2 illustrated in FIG. 3, with reference to FIGS. 8 and 9.

The local extremum calculator 21 calculates the local maximum and minimum by determining the magnitude relationship between adjacent samples in the samples of the high-resolution audio signal, subjected to the correction process by the waveform correction processor 1. The local extremum calculator 21 calculates the local maximum and minimum based on all the samples of the inputted high-resolution audio signal.

The local maximum and minimum calculated by the local extremum calculator 21 are not always equal to the local maximum and minimum calculated by the local extremum calculator 11 of FIG. 2, respectively. It is therefore preferable that the waveform correction processors 1 and 2 individually calculate the local maximum and minimum.

It is assumed herein that the local maximum and minimum calculated by the local extremum calculator 21 are equal to the local maximum and minimum calculated by the local extremum calculator 11, respectively. The local extremum calculator 21 calculates that the samples S0 and S8 are local minimum and maximum in FIG. 8, respectively.

The number-of-sample detector 22 detects the number of samples (sample intervals) between the local maximum and minimum. The number of samples herein refers to the number of samples taken at the sample intervals T1 of the high-resolution audio signal. In the case of FIG. 8, the number-of-sample detector 22 detects that the interval between the local maximum and minimum corresponds to eight samples.

The difference calculator 23 receives the result of detection by the number-of-sample detector 22 and the high-resolution audio signal. The difference calculator 23 calculates differences between adjacent samples in the high-resolution audio signal. The adjacent samples herein are samples located at the sample intervals T1 of the high-resolution audio signal.

The correction value calculator 24 calculates correction values by multiplying the level differences between adjacent samples by a predetermined coefficient. The coefficient is less than 1. The correction value calculator 24 includes coefficients set corresponding to each number of samples between the local maximum and minimum. The correction value calculator 24 selects the coefficient corresponding to the number of samples detected by the number-of-sample detector 22.

It is preferred that the correction values be adjusted by selecting the coefficient by which the differences are to be multiplied through a level selection signal inputted to the correction value calculator 24.

The level selection signal inputted to the correction value calculator 24 is preferably the same as the level selection signal inputted to the correction value calculator 14. It is preferable to input a common level selection signal to the correction value calculators 14 and 24.

The adder/subtractor 25 adds correction values to samples near the local maximum, and subtracts correction values from samples near the local minimum. In addition, the adder/subtractor 25 may add a correction value to the local maximum sample and subtract a correction value from the local minimum sample.

The adder/subtractor 25 also adds the correction values to the samples near the local maximum, and subtracts the correction values from the samples near the local minimum based on the idea described in FIGS. 6A, 6B, 7A, and 7B.

The number-of-sample detector 22 has detected that the interval between the local maximum and minimum corresponds to eight samples. As described in FIG. 7A, the adder/subtractor 25 adds the correction values Vadd to the sample S7, which precedes the sample S8 of the local maximum, and the sample S6, which precedes the sample S8 by two samples.

To be specific, the correction value calculator 24 calculates the correction values by multiplying the level difference between the samples S6 and S7 and the level difference between the samples S7 and S8 by a correction value. As illustrated in FIG. 9, the adder/subtractor 25 adds the correction values Vadd2 to the samples S6 and S7, and subtracts the correction values Vsub2 from the samples S1 and S2.

By the waveform correction process described above as illustrated in FIG. 9, the correction values Vadd1 are added to the samples S4 to S7, and the correction values Vadd2 are further added to the samples S6 and S7. The correction values Vsub2 are subtracted from the samples S1 and S2.

In accordance with the digital audio processing apparatus according to the first embodiment and the digital audio processing method according to the first embodiment executed by the digital audio processing apparatus illustrated in FIGS. 1 to 3, it is possible to improve the sound quality of the target digital audio signal equally across the low, intermediate, and high frequencies.

Figure 10:
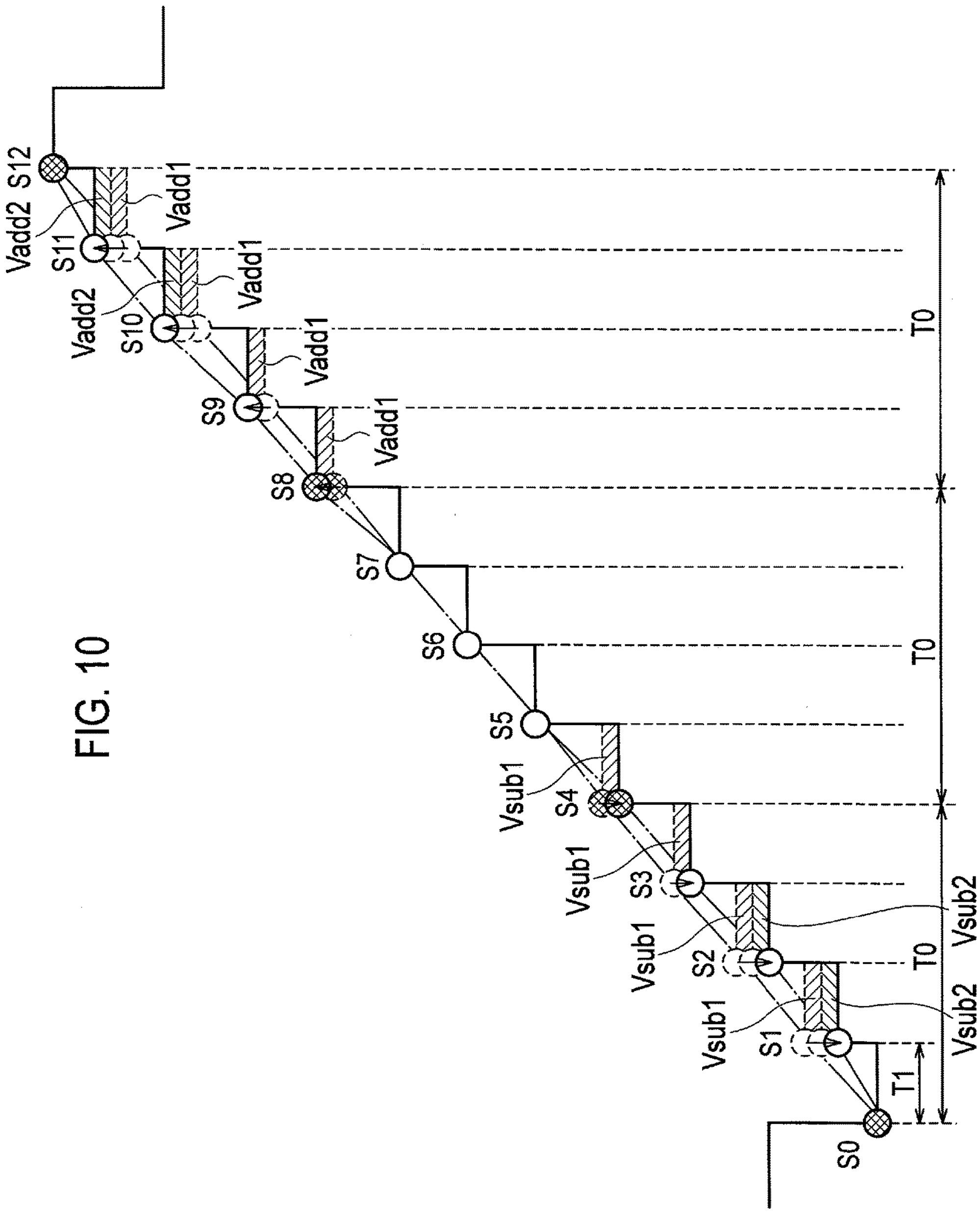
FIG. 10 is a waveform diagram illustrating a result of adding correction values by the waveform correction processor 1 illustrated in FIG. 2, and the waveform correction processor 2 illustrated in FIG. 3.

FIG. 10 illustrates a corrected waveform when the interval between the sample S0 of the local minimum and the sample S12 of the local maximum to three samples in terms of the sample intervals T0 of the CD audio signal.

The waveform correction processor 1 adds the correction values Vadd1 to the samples S8 to S11, and subtracts the correction values Vsub1 from the samples S1 to S4. The waveform correction processor 2 adds the correction values Vadd2 to the samples S10 and S11, and subtracts the correction values Vsub2 from the samples S1 and S2.

The aforementioned operation of the digital audio processing apparatus according to the first embodiment, and the aforementioned process of the digital audio processing method according to the first embodiment can be executed by a digital audio processing program (the digital audio processing program according to the first embodiment).

Figure 11:
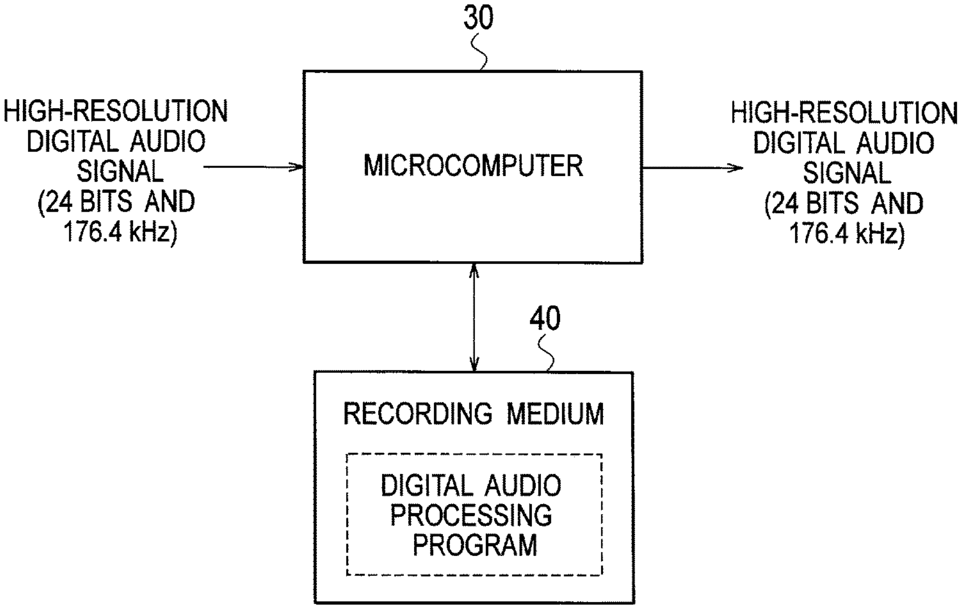
FIG. 11 is a block diagram illustrating a configuration example of a microcomputer executing a digital audio processing program according to the first embodiment.

As illustrated in FIG. 11, a microcomputer 30 is connected to a recording medium 40 that stores the digital audio processing program according to the first embodiment. The recording medium 40 is any non-transitory recording medium (storage medium) such as a hard disk drive, an optical disc, or a semiconductor memory. The digital audio processing program according to the first embodiment may be transmitted from an external server through a communication line such as the internet, to be recorded in the recording medium 40.

Figure 12:
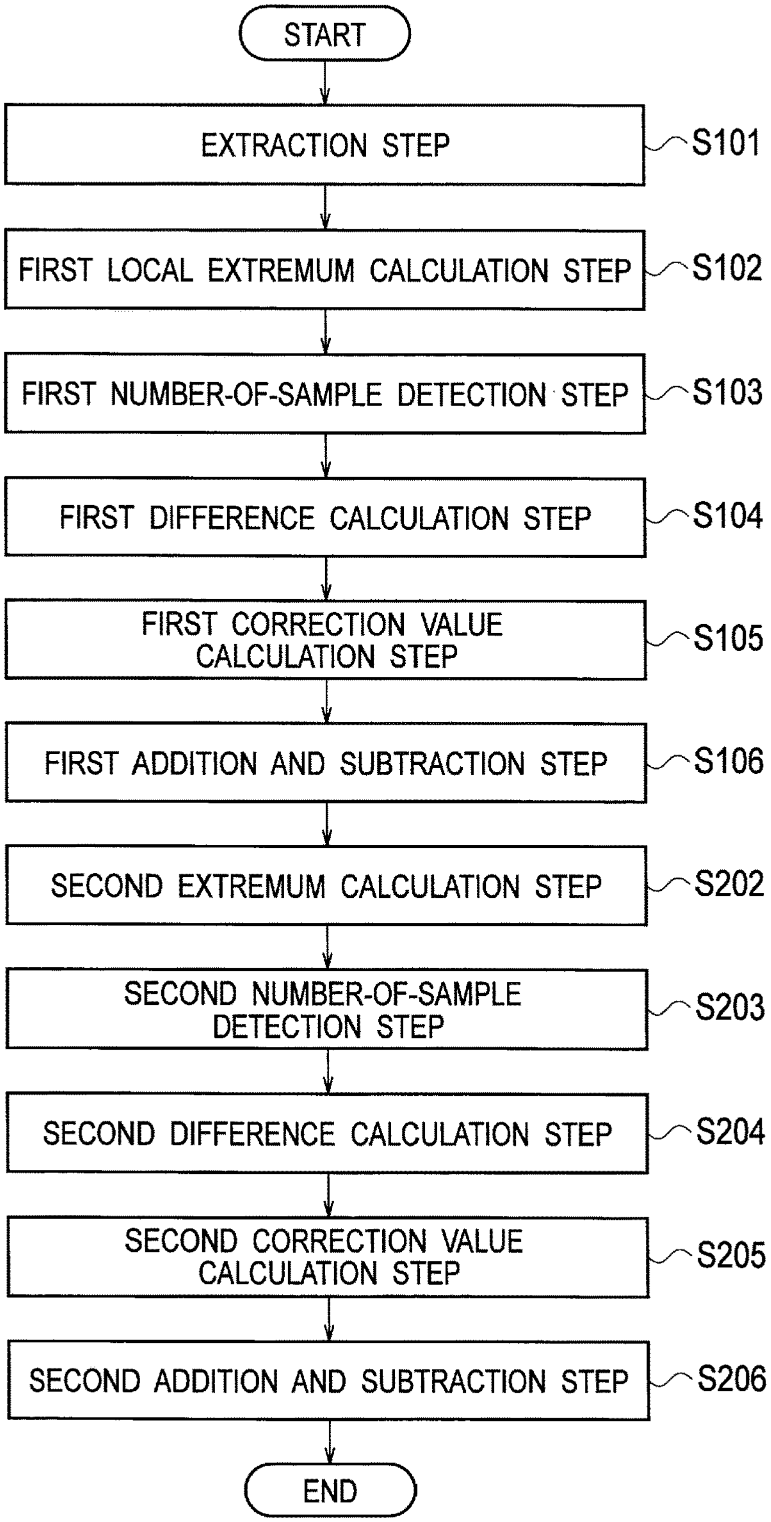
FIG. 12 is a flowchart illustrating a process that the digital audio processing program according to the first embodiment causes the microcomputer to execute.

The digital audio processing program according to the first embodiment causes the microcomputer 30 to execute the process of each step illustrated in FIG. 12.

Extraction step S101: the digital audio processing program according to the first embodiment causes the microcomputer 30 to execute a process to extract samples at sample intervals of the first digital audio signal from the samples constituting the target digital audio signal.

First local extremum calculation step S102: the digital audio processing program according to the first embodiment causes the microcomputer 30 to execute a process to calculate local maximum and minimum samples based on the samples extracted in the extraction step.

First number-of-sample detection step S103: the digital audio processing program according to the first embodiment causes the microcomputer 30 to execute a process to detect the number of samples between the local maximum and minimum samples adjacent to each other.

First difference calculation step S104: the digital audio processing program according to the first embodiment causes the microcomputer 30 to execute a process to calculate differences between adjacent samples that constitute the target digital audio signal.

First correction value calculation step S105: the digital audio processing program according to the first embodiment causes the microcomputer 30 to execute a process to calculate correction values by multiplying by a predetermined coefficient, the differences calculated in the first difference calculation step S104.

First addition and subtraction step S106: the digital audio processing program according to the first embodiment causes the microcomputer 30 to execute a process to add the correction values calculated in the first correction value calculation step S105 to at least the samples from the sample preceding the local maximum sample calculated in the first local extremum calculation step S102, to the sample which precedes the local maximum sample and is separated from the local maximum sample by a one sample interval of the first digital audio signal, and at least samples from the sample following the local maximum sample calculated in the first local extremum calculation step S102 to the sample which follows the local maximum sample and is separated from the local maximum sample by a one sample interval of the first digital audio signal.

The digital audio processing program according to the first embodiment causes the microcomputer 30 to execute a process to subtract the correction values calculated in the first correction value calculation step S105, from at least samples from the sample preceding the local minimum sample calculated by the first local extremum calculation step S102, to the sample which precedes the local minimum sample and is separated from the local minimum sample by a one sample interval of the first digital audio signal, and at least samples from the sample following the local minimum sample calculated in the first local extremum calculation step S102 to the sample following the local minimum sample and is separated from the local minimum sample by a one sample interval of the first digital audio signal.

Second extremum calculation step S202: the digital audio processing program according to the first embodiment causes the microcomputer 30 to execute a process to calculate samples that are local maximum and minimum based on the samples constituting the digital audio signal, which has been subjected to the addition and subtraction processes in the first addition and subtraction step S106.

Second number-of-sample detection step S203: the digital audio processing program according to the first embodiment causes the microcomputer 30 to execute a process to detect the number of samples between the adjacent samples that are the local maximum and minimum.

Second difference calculation step S204: the digital audio processing program according to the first embodiment causes the microcomputer 30 to execute a process to calculate level differences between adjacent samples that constitute the target digital audio signal.

Second correction value calculation step S205: the digital audio processing program according to the first embodiment causes the microcomputer 30 to execute a process to calculate correction values by multiplying by a predetermined coefficient the differences calculated in the first difference calculation step S204.

Second addition and subtraction step S206: the digital audio processing program according to the first embodiment causes the microcomputer 30 to execute a process to add the correction values calculated in the second correction value calculation step S205, among the samples constituting the target digital audio signal, to at least the samples preceding and following the local maximum sample calculated in the second local extremum calculation step S202.

The digital audio processing program according to the first embodiment causes the microcomputer 30 to execute a process to subtract the correction values calculated in the second correction value calculation step S205 from at least the samples preceding and following the local minimum sample calculated in the second local extremum calculation step S202.

In the above-described digital audio processing apparatus, method, and program according to the first embodiment, the waveform correction processes in the waveform correction processors 1 and 2 share the table illustrated in FIG. 5. The waveform correction processes in the waveform correction processors 1 and 2 may use different tables.

The table used in the waveform correction process at the waveform correction processor 1 may be different from the table used in the waveform correction process in the waveform correction processor 2 in terms of the maximum number of sample intervals.

For example, the waveform correction process at the waveform correction processor 1 uses a table including correction values set for intervals of two to eight sample intervals, and the waveform correction process at the waveform correction processor 1 uses a table including correction values set for intervals of to 2 to 32 samples.

The table used in the waveform correction process by the waveform correction processor 1 may be different from the table used in the waveform correction process in the waveform correction processor 2 in terms of coefficients.

The tables used in the waveform correction processes by the waveform correction processor 1 and 2 may be different in terms of the range of samples which are subjected to addition and subtraction of correction values.

For example, in the waveform correction process by the waveform correction processor 1, the correction values are added to or subtracted from the local maximum or minimum sample and two samples adjacent to the respective local maximum or minimum sample at the maximum in the samples of the first digital audio signal. In the waveform correction process at the waveform correction processor 2, the correction values are added to or subtracted from the local maximum or minimum sample and eight samples adjacent to the local maximum or minimum sample at the maximum in the samples of the second digital audio signal.

Second Embodiment

Next, a description is given of a digital audio processing apparatus, a digital audio processing method, and a digital audio processing program according to the second embodiment, with reference to the accompanying drawings.

In the second embodiment, the target digital audio signal is a first digital audio signal having a first sampling frequency. The first digital audio signal is a CD audio signal, for example.

The digital audio processing apparatus according to the second embodiment outputs a digital audio signal obtained by conversion to a second digital audio signal having a second sampling frequency that is higher than the first sampling frequency. The second digital audio signal is a high-resolution audio signal, for example.

In the example of the second embodiment, the first digital audio signal is a CD audio signal with a sampling bit depth of 16 bits and a sampling frequency of 44.1 kHz, and the second digital audio signal is a digital audio signal with a sampling bit depth of 24 bits and a sampling frequency of 176.4 kHz.

The first and second digital audio signals are not limited to the above-described examples. The first digital audio signal may be a digital audio signal with a sampling bit depth of 16 bits and a sampling frequency of 48 kHz while the second digital audio signal is a digital audio signal with a sampling bit depth of 24 bits and a sampling frequency of 192 kHz.

The first digital audio signal may be a digital audio signal with a sampling bit depth of 24 bits and a sampling frequency of 96 kHz, while the second digital audio signal is a digital audio signal with a sampling bit depth of 24 bits and a sampling frequency of 192 kHz.

Figure 13:
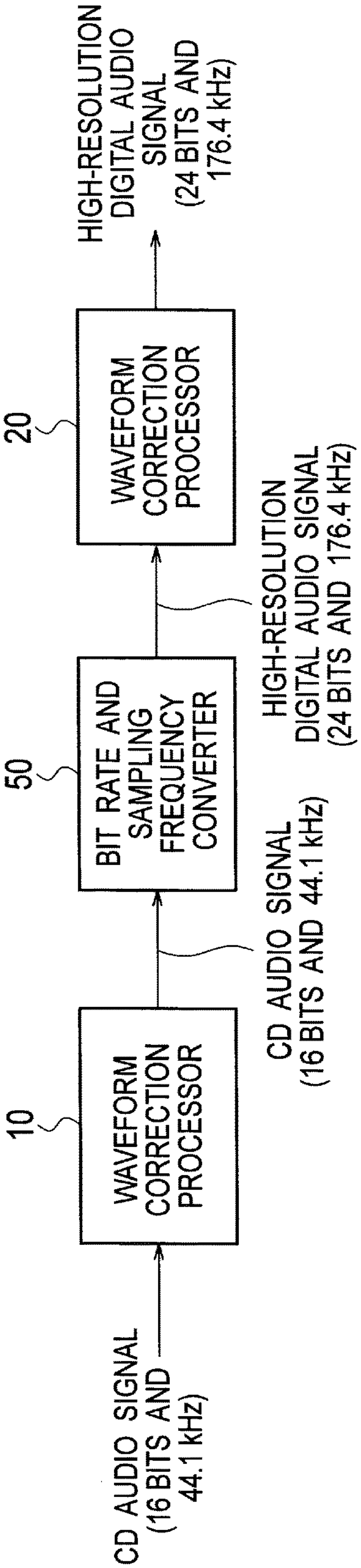
FIG. 13 is a block diagram illustrating the entire configuration of a digital audio processing apparatus according to the second embodiment.

In FIG. 13, the CD audio signal is inputted to the waveform correction processor 10, to be subjected to a waveform correction process described later. The CD audio signal outputted from the waveform correction processor 10 is inputted to a bit depth and sampling frequency converter 50, to be subjected to later-described bit depth conversion and sampling frequency conversion. The bit depth and sampling frequency converter 50 outputs the high-resolution audio signal with a sampling bit depth of 24 bits and a sampling frequency of 176.4 kHz.

The high-resolution audio signal is inputted to the waveform correction processor 20, and is subjected to a later-described waveform correction process to be outputted.

Figure 14:
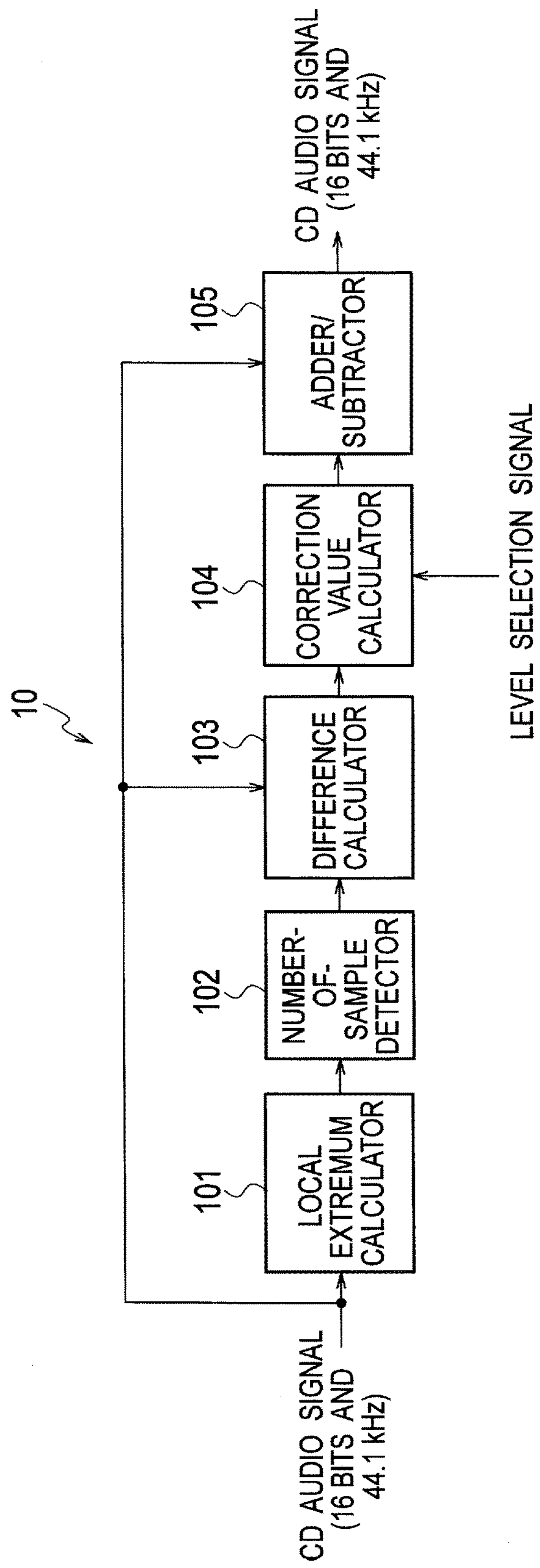
FIG. 14 is a block diagram illustrating a concrete configuration example of a waveform correction processor 10 illustrated in FIG. 13.
Figure 15:
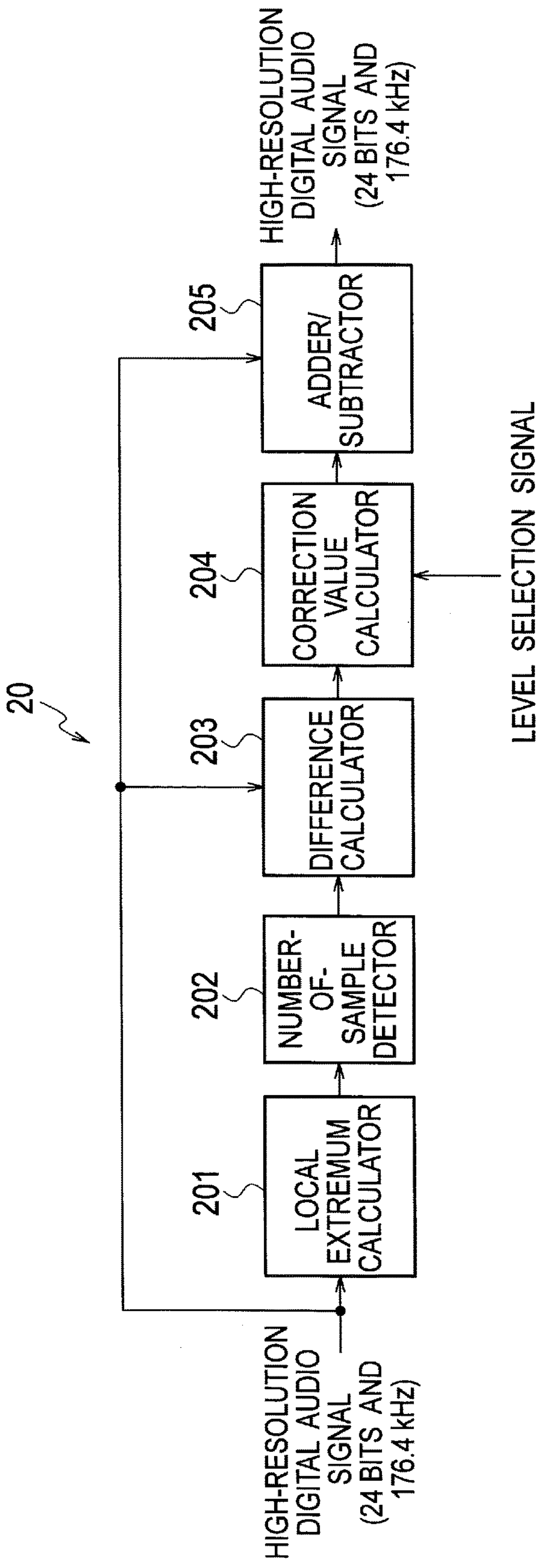
FIG. 15 is a block diagram illustrating a concrete configuration example of a waveform correction processor 20 illustrated in FIG. 13.

As illustrated in FIG. 14, the waveform correction processor 10 includes a local extremum calculator 101, a number-of-sample detector 102, a difference calculator 103, a correction value calculator 104, and an adder/subtractor 105. As illustrated in FIG. 15, the waveform correction calculator 20 includes a local extremum calculator 201, a number-of-sample detector 202, a difference calculator 203, a correction value calculator 204, and an adder/subtractor 205.

Each section constituting the waveform correction processors 10 and 20 may be composed of hardware or software, and may be each composed of a combination of hardware and software. Each section constituting the waveform correction processors 10 and 20 may be composed of an integrated circuit, or the entire waveform correction processors 10 and 20 may be individually composed of an integrated circuit.

First, a description is given of an operation of the waveform correction processor 10 illustrated in FIG. 14, with reference to FIGS. 5 to 7B, 16, and 17.

Figure 16:
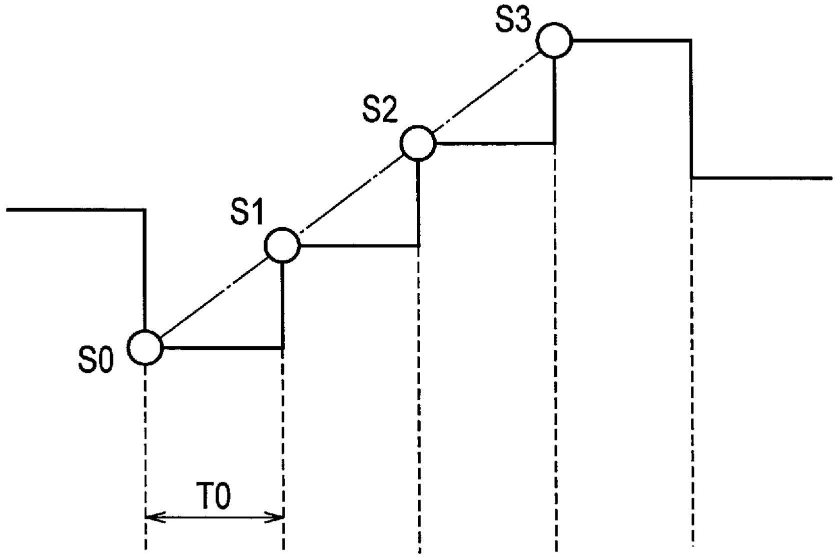
FIG. 16 is a waveform diagram illustrating an example of samples constituting a CD audio signal to be processed by the digital audio processing apparatus, the digital audio processing method, and the digital audio processing program according to the second embodiment.

FIG. 16 illustrates an example of the waveform of samples constituting the CD audio signal. FIG. 16 illustrates only a part of the waveform where the sample level increases with time. As illustrated in FIG. 16, the CD audio signal includes samples S0 to S3.

The local extremum calculator 101 determines the magnitude relationship between adjacent samples in the samples of the inputted CD audio signal. In the case of FIG. 16, the local extremum calculator 101 calculates that samples S0 and S3 are local minimum and maximum, respectively.

The number-of-sample detector 102 detects the number of samples (sample intervals) between the local maximum and minimum. The number of samples between the local maximum and minimum refers to the number of samples at the sample intervals T0 of the CD audio signal. In the case of FIG. 16, the number-of-sample detector 102 detects that the interval between the local maximum and minimum corresponds to three samples.

The number of samples detected by the number-of-sample detector 102 refers to the number of samples in a part where the sample level increases from the local minimum to maximum as illustrated in FIG. 16, or the number of samples in a part where the sample level decreases from the local maximum to the minimum.

The difference calculator 103 receives the result of detection by the number-of-sample detector 102 and the CD audio signal. The difference calculator 103 calculates level differences between adjacent samples in the CD audio signal.

The correction value calculator 104 calculates correction values by multiplying level differences between adjacent samples by a predetermined coefficient. The coefficient is equal to or less than 1. The correction value calculator 104 includes coefficients corresponding to each number of samples. The correction value calculator 104 selects a coefficient corresponding to the number of samples detected by the number-of-sample detector 102.

It is preferred that the correction values be adjusted by selecting the coefficient by which the differences are to be multiplied through a level selection signal inputted to the correction value calculator 104.

The adder/subtractor 105 adds correction values to samples near the local maximum, and subtracts correction values from samples near the local minimum. In addition, the adder/subtractor 105 may add a correction value to the local maximum sample, and subtract a correction value from the local minimum sample. The meaning of "near the local maximum or minimum sample" is described later.

Examples of the coefficient by which the correction value calculator 104 multiplies the level differences between adjacent samples are the same as those in FIG. 5. As illustrated in FIG. 5, the correction value calculator 104 includes coefficients corresponding to the level selection signals 00, 01, 10, and 11 for each number of samples between the local maximum and minimum (starting from two samples to a predetermined number of samples).

In the waveform of the CD audio signal illustrated in FIG. 16, where the interval between the local maximum and minimum corresponds to three samples, when the level selection signal is 00, the correction value calculator 104 multiplies the level differences between adjacent samples by a coefficient of ½ to obtain correction values. When the level selection signal is 01, the correction value calculator 104 multiplies the level differences between adjacent samples by a coefficient of ¼ to obtain correction values.

The basic idea of samples near the local maximum or minimum to which the adder/subtractor 105 adds or subtracts the correction values is the same as that of FIGS. 6 and 7. The basic idea similarly applies to the addition and subtraction processes at the adder/subtractor 205 in FIG. 15.

As an example, the adder/subtractor 105 selects the addition and subtraction processes illustrated in FIGS. 6A and 6B, or the addition and subtraction processes illustrated in FIGS. 7A and 7B, according to the number of samples between the local maximum and minimum.

To be specific, the adder/subtractor 105 performs the addition and subtraction processes as follows when the interval between the local maximum and minimum corresponds to two to five samples. As illustrated in FIG. 6A, the adder/subtractor 105 adds to the samples S (−1) and S (+1), which precedes and follows the local maximum sample Smax, the correction values obtained by multiplying the differences Δ(−1) and Δ(+1) by the coefficient illustrated in FIG. 5, respectively.

The difference Δ(−1) is the level difference between the local maximum sample Smax and the sample S (−1), which precedes the sample Smax. The difference Δ(+1) is the level difference between the local maximum sample Smax and the sample S (+1), which follows the sample Smax.

The hatched sections in FIG. 6A represent the correction values Vadd, which are added to the samples S (−1) and S (+1).

As illustrated in FIG. 6B, the adder/subtractor 105 subtracts from the samples S (−1) and S (+1), which precedes and follows and local minimum sample Smin, the correction values obtained by multiplying the differences Δ(−1) and Δ(+1) by the coefficient illustrated in FIG. 5, respectively.

The hatched sections in FIG. 6B represent the correction values Vsub, which are subtracted from the samples S (−1) and S (+1).

The adder/subtractor 105 performs the addition and subtraction processes as follows when the interval between the local maximum and minimum corresponds to six samples or more. As illustrated in FIG. 7A, the adder/subtractor 105 adds to the samples S (−1) and S (−2), which are consecutive samples preceding the local maximum sample Smax, and S (+1) and S (+2), which are consecutive samples following the local maximum sample Smax, correction values obtained by multiplying the differences Δ(−1), Δ(−2), Δ(+1), and Δ(+2) by the coefficient illustrated in FIG. 5, respectively.

The difference Δ(−2) is the level difference between the samples S (−1) and S (−2), which are consecutive samples preceding the sample Smax. The difference Δ(+2) is the level difference between the samples S (+1) and S (+2), which are consecutive samples following the sample Smax.

In a similar manner, the hatched sections in FIG. 7A represent the correction values Vadd, which are added to the samples S (−1), S (−2), S (+1), and S (+2).

Moreover, as illustrated in FIG. 7B, the adder/subtractor 105 subtracts from the samples S (−1) and S (−2), which are consecutive samples preceding the local minimum sample Smin, and S (+1) and S (+2), which are consecutive samples following the local minimum sample Smin, correction values obtained by multiplying the differences Δ(−1), Δ(−2), Δ(+1), and Δ(+2) by the coefficient illustrated in FIG. 5, respectively.

In a similar manner, the hatched sections in FIG. 7B represent the correction values Vsub, which are subtracted from the samples S (−1), S (−2), S (+1), and S (+2).

Based on the aforementioned basic idea, the adder/subtractor 105 adds the correction values to the samples near the local maximum, and subtracts the correction values from the samples near the local minimum.

Based on the basic idea illustrated in FIGS. 6A and 6B, when the interval between the local maximum and minimum corresponds to two samples, the intermediate sample between the local maximum and minimum is subjected to both the addition and subtraction processes. In order to avoid such a problem, when the interval between the local maximum and minimum corresponds to two samples, the adder/subtractor 105 preferably performs only the addition process for the intermediate sample.

In the case where the intervals between the local maximum and minimum corresponds to two samples, the adder/subtractor 105 may perform only the addition process for the intermediate sample when the sample level increases from the local minimum to maximum while performing only the subtraction process for the intermediate sample when the sample level decreases from the local maximum to the minimum.

In the above description, the process for the interval of two to five samples is differentiated from the process for the interval of five or more samples. This is shown by way of example, and the invention is not limited to such a configuration. Moreover, the correction values may be added to the samples three or more samples preceding and following the local maximum sample Smax, or may be subtracted from three or more samples preceding and following the local minimum sample Smin.

Figure 17:
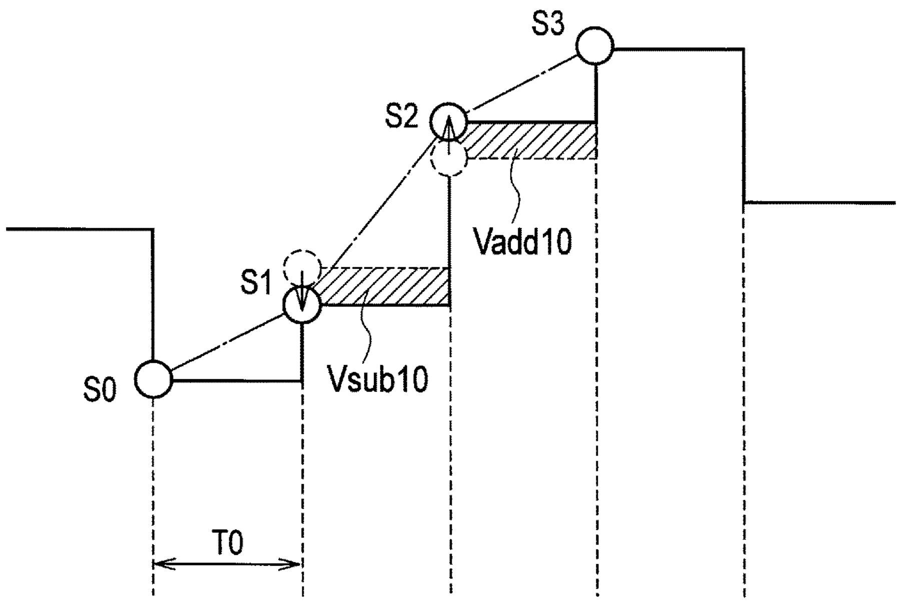
FIG. 17 is a waveform diagram illustrating a result of adding and subtracting correction values to and from the CD audio signal illustrated in FIG. 16 by the waveform correction processor 10 illustrated in FIG. 14.

The correction value calculator 104 multiplies the level difference between the samples S0 and S1 and the level difference between the samples S2 and S3 (illustrated in FIG. 16) by the coefficients to calculate the correction values. As illustrated in FIG. 17, the adder/subtractor 105 adds the correction values Vadd10 to the sample S2 and subtracts Vsub10 from the sample S1.

In addition, the adder/subtractor 105 may add to the sample S3 of the local maximum, the correction value Vadd10 obtained by multiplying the level difference between the samples S2 and S3 by the coefficient and subtracts from the sample S0 of the local minimum, the correction value Vsub10 obtained by multiplying the level difference between the samples S0 and S1 by the coefficient.

The samples of the CD signal illustrated in FIG. 17 are inputted to the bit depth and sampling frequency converter 50, and are converted into a high-resolution audio signal with a sampling bit depth of 24 bits and a sampling frequency of 176.4 kHz.

Figure 18:
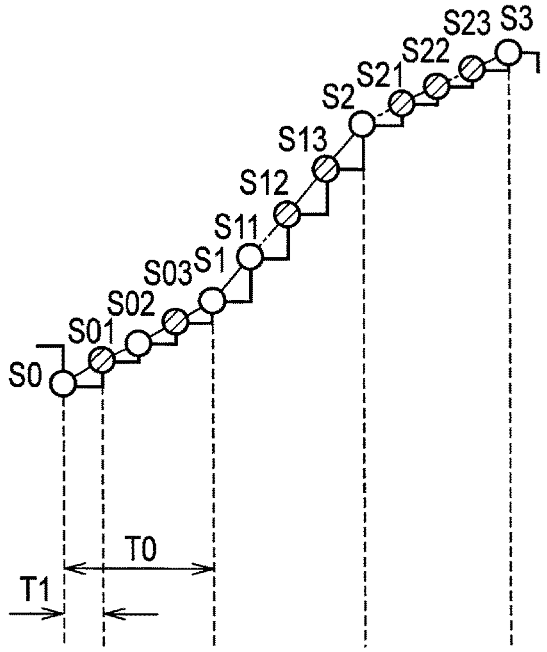
FIG. 18 is a waveform diagram illustrating a result of bit depth conversion and sampling frequency conversion performed by the bit depth and sampling frequency converter 50 for the digital audio signal outputted from the waveform correction processor 10.

FIG. 18 illustrates the samples of the high-resolution audio signal outputted from the bit depth and sampling frequency converter 50. As illustrated in FIG. 18, samples S01, S02, and S03 are newly created between the samples S0 and S1 of the CD signal. Samples S11, S12, and S13 are newly created between the samples S1 and S2, and the samples S21, S22, and S23 are newly created between the samples S2 and S3.

Figure 19:
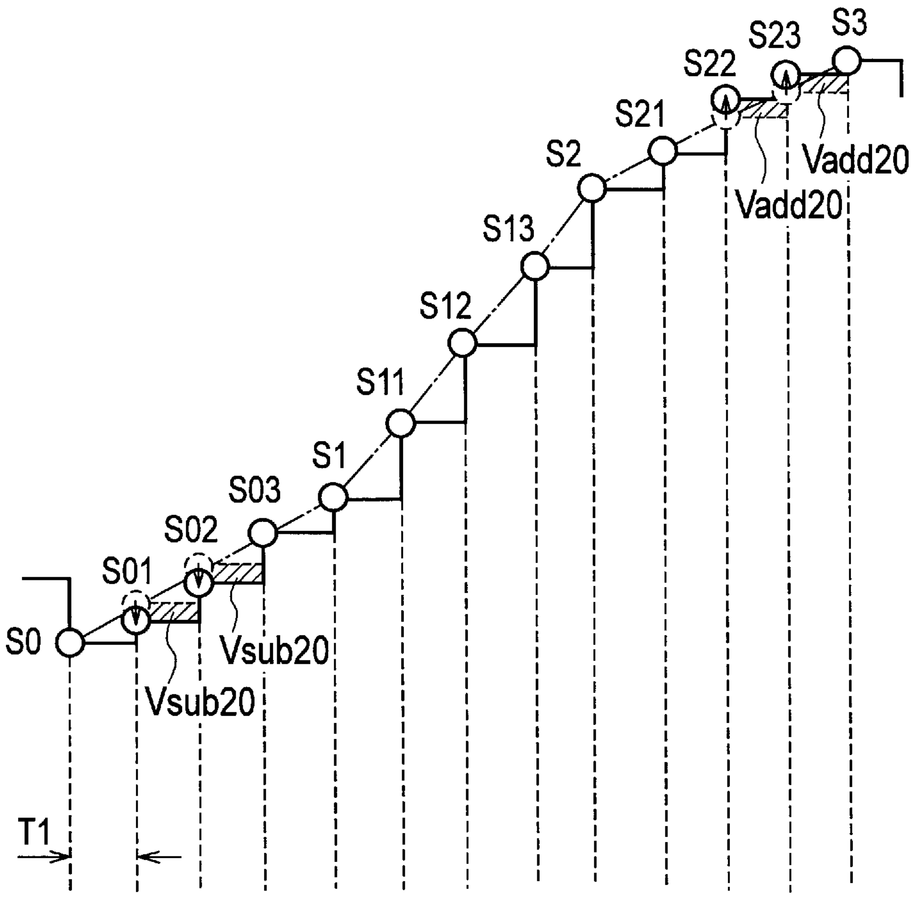
FIG. 19 is a waveform illustrating a result of adding and subtracting correction values to and from the high-resolution audio signal illustrated in FIG. 18, by the waveform correction processor 20 illustrated in FIG. 15.

Next, a description is given of the operation of the waveform correction processor 20 illustrated in FIG. 15 with reference to FIGS. 18 and 19.

The local extremum calculator 201 calculates the local maximum and minimum by determining the magnitude relationship between adjacent samples in the samples of the high-resolution audio signal outputted from the bit depth and sampling frequency converter 50.

The local maximum and minimum calculated by the local extremum calculator 201 are not always equal to the local maximum and minimum calculated by the local extremum calculator 101 of FIG. 14, respectively. It is therefore preferred that the waveform correction processors 10 and 20 individually calculate the local maximum and minimum.

It is assumed herein that the local maximum and minimum calculated by the local extremum calculator 201 are equal to the local maximum and minimum calculated by the local extremum calculator 101, respectively. The local extremum calculator 201 calculates that the samples S0 and S3 are local minimum and maximum in FIG. 18, respectively.

The number-of-sample detector 202 detects the number of samples (sample intervals) between the local maximum and minimum. The number of samples herein refers to the number of samples taken at the sample intervals T1 of the Hi-RES audio signal. In the case of FIG. 18, the number-of-sample detector 202 detects that the interval between the local maximum and minimum corresponds to 12 samples.

The difference calculator 203 receives the result of detection by the number-of-sample detector 202 and the high-resolution audio signal. The difference calculator 203 calculates level differences between adjacent samples in the high-resolution audio signal. The adjacent samples herein refer to samples taken at the sample intervals T1 of the high-resolution audio signal.

The correction value calculator 204 calculates correction values by multiplying the level differences between adjacent samples by a predetermined coefficient. The coefficient is less than 1. The correction value calculator 204 includes the coefficients set corresponding to each number of samples between the local maximum and minimum. The correction value calculator 204 selects the coefficient corresponding to the number of samples detected by the number-of-sample detector 202.

It is preferred that the correction values be adjusted by selecting the coefficient by which the differences are to be multiplied through a level selection signal inputted to the correction value calculator 204.

The level selection signal inputted to the correction value calculator 204 is preferably the same as the level selection signal inputted to the correction value calculator 104. It is preferable to input a common level selection signal to the correction value calculators 104 and 204.

The adder/subtractor 205 adds correction values to samples near the local maximum and subtracts correction values from samples near the local minimum. In addition, the adder/subtractor 205 may add a correction value to the local maximum sample and subtract a correction value from the local minimum sample.

The adder/subtractor 205 also adds the correction values to samples near the local maximum and subtracts the correction values from samples near the local minimum based on the idea described in FIGS. 6A, 6B, 7A, and 7B.

The number-of-sample detector 202 has detected that the interval between the local maximum and minimum corresponds to 12 samples. As described in FIG. 7A, the adder/subtractor 205 adds the correction values Vadd to the sample S23, which precedes the sample S3 of the local maximum, and the sample S22, which precedes the sample S3 by two samples.

As described in FIG. 7B, the adder/subtractor 205 subtracts the correction values Vsub from the sample S01, which is following the sample S0 of the local minimum, and the sample S02, which is two samples following the sample S0.

To be specific, the correction value calculator 204 calculates correction values by multiplying the level difference between the samples S22 and S23 and the level difference between the samples S23 and S3 by the coefficient. As illustrated in FIG. 19, the adder/subtractor 205 adds the correction values Vadd20 to the samples S22 and S23.

The correction value calculator 204 calculates correction values by multiplying the level difference between the samples S0 and S01 and the level difference between the samples S01 and S02 by the coefficient. As illustrated in FIG. 19, the adder/subtractor 205 subtracts the correction values Vsub20 from the samples S01 and S02.

By the waveform correction process described above, as illustrated in FIG. 17, the correction value Vadd10 is added to the sample S2, and the correction value Vsub10 is subtracted from the sample S1, so that the CD audio signal is corrected. The corrected CD audio signal is then converted to the high-resolution audio signal as illustrated in FIG. 18.

As illustrated in FIG. 19, moreover, the correction values Vadd20 are added to the samples S22 and S23, and the correction values Vsub20 are subtracted from the samples S01 and S02, so that the corrected high-resolution audio signal is obtained.

In accordance with the digital audio processing apparatus according to the second embodiment and the digital audio processing method according to the second embodiment executed by the digital audio processing apparatus illustrated in FIGS. 13 to 15, it is possible to improve the sound quality of the digital audio signal which is obtained by converting the first digital audio signal to the second digital audio signal. The first digital audio signal has the first sampling frequency, which is a CD audio signal, for example. The second digital audio signal has the second sampling frequency that is higher than the first sampling frequency. The second digital audio signal is a high-resolution audio signal, for example.

In accordance with the digital audio processing apparatus and the method according to the second embodiment, the frequency band of the correction signal added to the high-resolution audio signal by the waveform correction processor 10 is different from that added to the high-resolution audio signal by the waveform correction processor 20. The former and latter frequency bands both include high frequencies. However, the former frequency band is lower than the latter frequency band. The latter frequency band is higher than the former frequency band.

In accordance with the digital audio processing apparatus and the method according to the second embodiment, it is therefore possible to effectively improve the sound quality in terms of the auditory feeling.

The aforementioned operation of the digital processing apparatus according to the second embodiment and the aforementioned process of the digital audio processing method according to the second embodiment can be executed by a digital audio processing program (the digital audio processing program according to the second embodiment).

Figure 20:
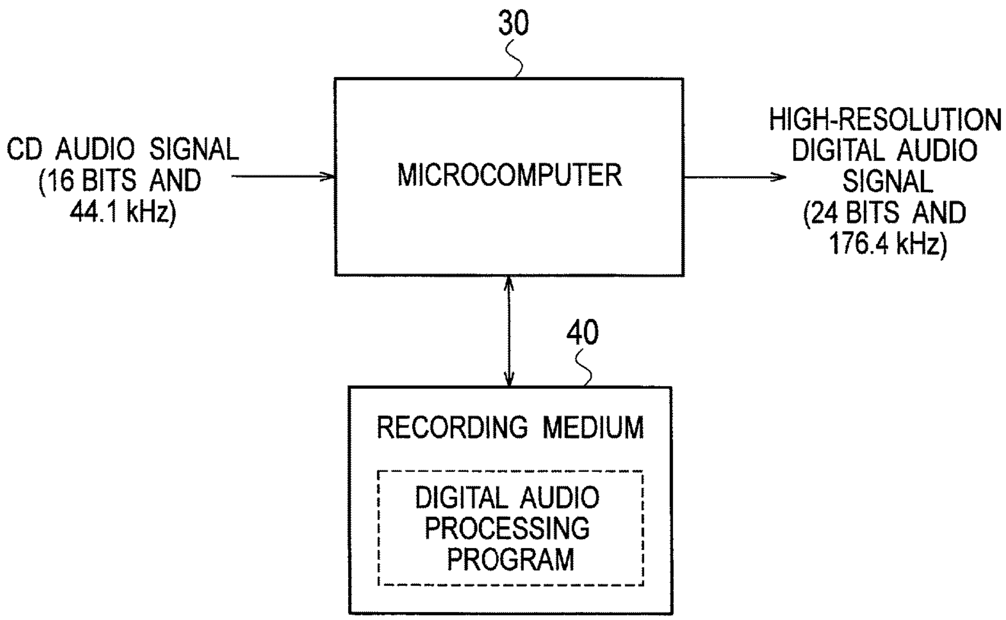
FIG. 20 is a block diagram illustrating a configuration example of a microcomputer executing the digital audio processing program according to the second embodiment.

As illustrated in FIG. 20, to execute the digital audio processing program according to the second embodiment, the CD audio signal is inputted to the microcomputer 30. The digital audio processing program according to the second embodiment is stored in the recording medium 40.

Figure 21:
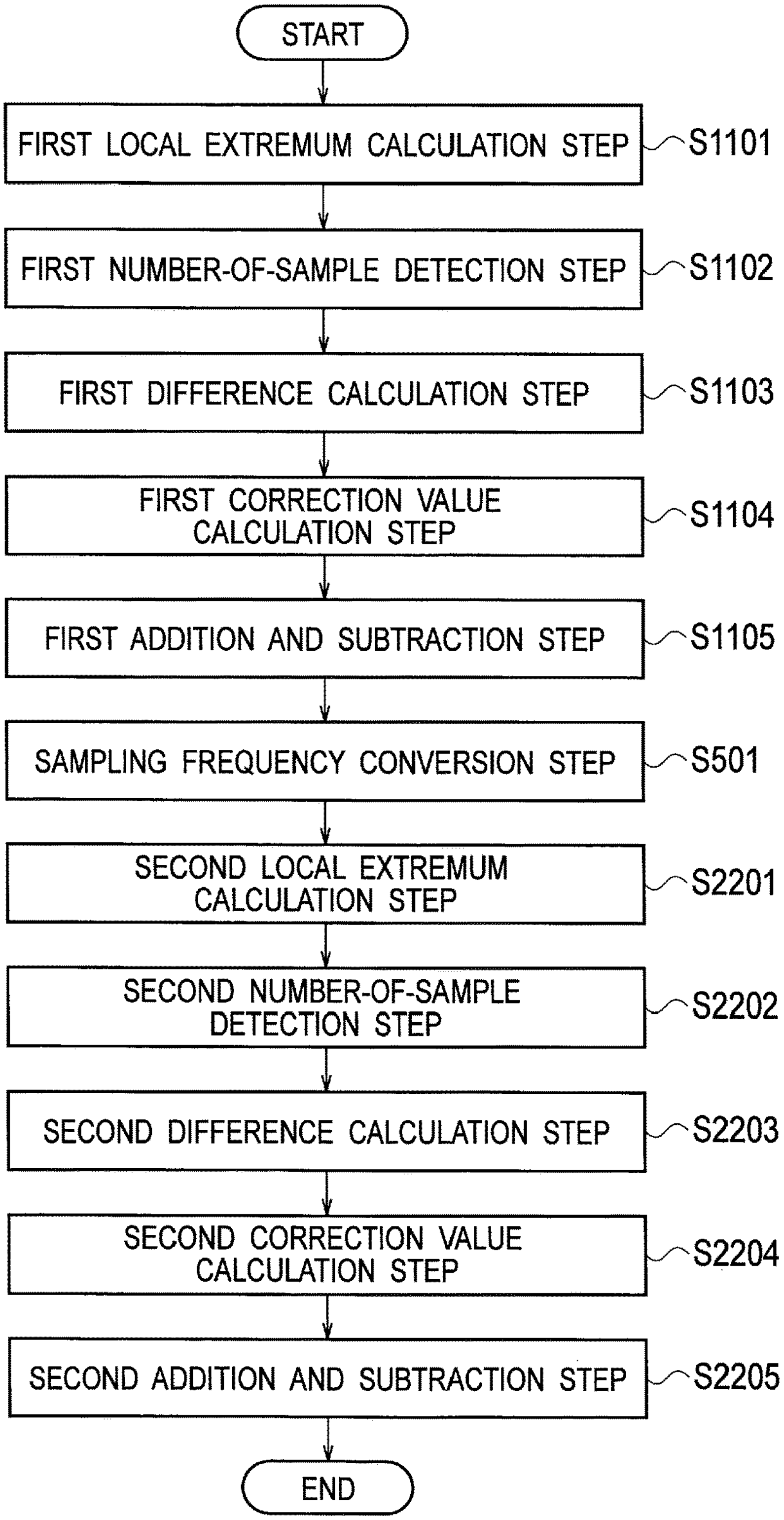
FIG. 21 is a flowchart illustrating a process that the digital audio processing program according to the second embodiment causes the microcomputer to execute.

The digital audio processing program according to the second embodiment causes the microcomputer 30 to execute the process of each step illustrated in FIG. 21.

First local extremum calculation step S1101: the digital audio processing program according to the second embodiment causes the microcomputer 30 to execute a process to calculate samples that are local maximum and minimum based on the samples of the CD audio signal.

First number-of-sample detection step S1102: the digital audio processing program according to the second embodiment causes the microcomputer 30 to execute a process to detect the number of samples between the local maximum and minimum samples adjacent to each other.

First difference calculation step S1103: the digital audio processing program according to the second embodiment causes the microcomputer 30 to execute a process to calculate level differences between adjacent samples in the samples constituting the CD audio signal.

First correction value calculation step S1104: the digital audio processing program according to the second embodiment causes the microcomputer 30 to execute a process to calculate correction values by multiplying by a predetermined coefficient, the differences calculated in the first difference calculation step S1103.

First addition and subtraction step S1105: the digital audio processing program according to the second embodiment causes the microcomputer 30 to execute a process to add the correction values calculated in the first correction value calculation step S1104, among the samples constituting the CD audio signal, to at least the samples preceding and following the local maximum sample calculated in the first local extremum calculation step S1101.

The digital audio processing program according to the second embodiment causes the microcomputer 30 to execute a process to subtract the correction values calculated in the first correction value calculation step S1104 from at least the samples preceding and following the local minimum sample calculated in the first local extremum calculation step S1101.

Sampling frequency conversion step S501: the digital audio processing program according to the second embodiment causes the microcomputer 30 to execute a process to convert to the high-resolution audio signal, the CD audio signal with the waveform corrected in the first addition and subtraction step S1105.

Second local extremum calculation step S2201: the digital audio processing program according to the second embodiment causes the microcomputer 30 to execute a process to calculate local maximum and minimum samples based on the samples constituting the high-resolution audio signal.

Second number-of-sample detection step S2202: the digital audio processing program according to the second embodiment causes the microcomputer 30 to execute a process to detect the number of samples between the adjacent local maximum and minimum samples.

Second difference calculation step S2203: the digital audio processing program according to the second embodiment causes the microcomputer 30 to execute a process to calculate level differences between adjacent samples in the samples constituting the high-resolution audio signal.

Second correction value calculation step S2204: the digital audio processing program according to the second embodiment causes the microcomputer 30 to execute a process to calculate correction values by multiplying by a predetermined coefficient the differences calculated in the second difference calculation step S2203.

Second addition and subtraction step S2205: the digital audio processing program according to the second embodiment causes the microcomputer 30 to execute a process to add the correction values calculated in the second correction value calculation step S2204, among the samples constituting the high-resolution audio signal, to at least the samples preceding and following the local maximum sample calculated in the second local extremum calculation step S2201.

The digital audio processing program according to the second embodiment causes the microcomputer 30 to execute a process to subtract the correction values calculated in the second correction value calculation step S2204 from at least the samples preceding and following the local minimum sample calculated in the second local extremum calculation step S2201.

In the above-described digital audio processing apparatus, method, and program according to the second embodiment, the waveform correction processes in the waveform correction processors 10 and 20 share the table illustrated in FIG. 5. The waveform correction processes in the waveform correction processors 10 and 20 may use different tables.

The table used in the waveform correction process by the waveform correction processor 10 may be different from the table used in the waveform correction process by the waveform correction processor 20 in terms of the maximum number of sample intervals.

For example, the waveform correction process by the waveform correction processor 10 uses a table including correction values set for intervals corresponding to two to eight samples, and the waveform correction process by the waveform correction processor 20 uses a table including correction values set for intervals corresponding to 2 to 32 samples.

The table used in the waveform correction process by the waveform correction processor 10 may be different from the table used in the waveform correction process by the waveform correction processor 20 in terms of coefficients.

The table used in the waveform correction process at the waveform correction processor 10 may be different from the table used in the waveform correction process at the waveform correction processor 20 in terms of the range of samples which are subjected to addition and subtraction of correction values.

For example, in the waveform correction process by the waveform correction processor 10, the correction values are added to the local maximum sample and two samples adjacent to the local maximum sample at the maximum in the samples of the first digital audio signal and are subtracted from the local minimum sample and the two samples adjacent to the local minimum sample at the maximum. In the waveform correction process by the waveform correction processor 20, the correction values are added to the local maximum sample and eight samples preceding and following the local maximum sample at the maximum in the samples of the second digital audio signal and are subtracted from the local minimum sample and the eight samples at the maximum preceding and following the local minimum sample at the maximum.

As described above, in both the waveform correction processes at the waveform correction processors 10 and 20, the target samples subjected to addition and subtraction of the correction values are set as follows.

When the interval between the local maximum and minimum corresponds to two to five samples (a first range), the samples preceding and following the local maximum or minimum are the target samples which are subjected to addition and subtraction of the correction values. When the interval between the local maximum and minimum corresponds to six samples or more (a second range) in which numbers of sample intervals are larger than those of the first range, the target samples include two consecutive samples preceding the local maximum or minimum and two consecutive samples following the local maximum or minimum.

The first and second ranges in the waveform correction process at the waveform correction processor 10 may be different from those in the waveform correction process at the waveform correction processor 20.

As described above, in accordance with the digital audio processing apparatus, the digital audio processing method, and the digital audio processing program according to the first and second embodiments, it is possible to improve the sound quality of the digital audio signal obtained by converting the first digital audio signal having the first sampling frequency into the second digital audio signal having the second sampling frequency which is higher than the first sampling frequency.

The invention is not limited to the embodiments described above and is variously changed without departing from the scope of the invention.

What is claimed is:

1. A digital audio processing apparatus, comprising:

a first waveform correction processor configured to correct the waveform of a first digital audio signal having a first sampling frequency;

a sampling frequency converter configured to convert the first digital audio signal with the waveform corrected by the first waveform correction processor, to a second digital audio signal having a second sampling frequency which is higher than the first sampling frequency; and a second waveform correction processor configured to correct the waveform of the second digital audio signal, wherein the first waveform correction processor comprises:

a first local extremum calculator configured, based on samples of the first digital audio signal, to calculate samples of local maximum and minimum adjacent to each other;

a first number-of-sample detector configured to detect the number of samples between the adjacent samples of the local maximum and minimum;

a first difference calculator configured to calculate level differences between adjacent samples in the samples constituting the first digital audio signal;

a first correction value calculator configured to calculate correction values by multiplying by a predetermined coefficient, the differences calculated by the first difference calculator; and a first adder/subtractor configured to add the correction values calculated by the first correction value calculator, among the samples constituting the first digital audio signal, to at least the samples preceding and following the sample of the local maximum calculated by the first local extremum calculator, and to subtract the correction values calculated by the first correction value calculator from at least the samples preceding and following the sample of the local minimum calculated by the first local extremum calculator;

the second waveform correction processor comprises:

a second local extremum calculator configured to calculate samples of local maximum and minimum based on samples constituting the second digital audio signal outputted from the sampling frequency converter;

a second number-of-sample detector configured to detect the number of samples between the samples of the local maximum and minimum adjacent to each other;

a second difference calculator configured to calculate level differences between adjacent samples in the samples constituting the second digital audio signal;

a second correction value calculator configured to calculate correction values by multiplying by a predetermined coefficient, the differences calculated by the second difference calculator; and a second adder/subtractor configured to add the correction values calculated by the second correction value calculator, among the samples constituting the second digital audio signal, to at least the samples preceding and following the sample of the local maximum calculated by the second local extremum calculator, and to subtract the correction values calculated by the second correction value calculator from at least the samples preceding and following the sample of the local minimum calculated by the second local extremum calculator.

2. The digital audio processing apparatus according to claim 1, wherein the first adder/subtractor when the number of samples detected by the first number-of-sample detector is within a first range, adds the correction values calculated by the first correction value calculator to the samples preceding and following the sample of the local maximum calculated by the first local extremum calculator and subtracts the correction values calculated by the first correction value calculator from the samples preceding and following the sample of the local minimum calculated by the first local extremum calculator, and when the number of samples detected by the first number-of-sample detector is within a second range in which numbers of samples are larger than those of the first range, adds the correction values calculated by the first correction value calculator to the samples preceding and following and two samples preceding and following the sample of the local maximum calculated by the first local extremum calculator and subtracts the correction values calculated by the first correction value calculator from the samples preceding and following and two samples preceding and following the sample of the local minimum calculated by the first local extremum calculator, and the second adder/subtractor when the number of samples detected by the second number-of-sample detector is within the first range, adds the correction values calculated by the second correction value calculator to the samples preceding and following the sample of the local maximum calculated by the second local extremum calculator and subtracts the correction values calculated by the second correction value calculator from the samples preceding and following the sample of the local minimum calculated by the second local extremum calculator, and when the number of samples detected by the second number-of-sample detector is within the second range, adds the correction values calculated by the second correction value calculator to the samples preceding and following and two samples preceding and following the sample of the local maximum calculated by the second local extremum calculator and subtracts the correction values calculated by the second correction value calculator from the samples preceding and following and two samples preceding and following the sample of the local minimum calculated by the second local extremum calculator.

3. A digital audio processing method, comprising:

a first local extremum calculation step of calculating samples of local maximum and minimum based on samples of a first digital audio signal having a first sampling frequency;

a first number-of-sample detection step of detecting the number of samples between the adjacent samples of the local maximum and minimum;

a first difference calculation step of calculating level differences between adjacent samples in the samples constituting the first digital audio signal;

a first correction value calculation step of calculating correction values by multiplying by a predetermined coefficient the differences calculated in the first difference calculation step;

a first addition and subtraction step of adding the correction values calculated in the first correction value calculation step, among the samples constituting the first digital audio signal, to at least the samples preceding and following the sample of the local maximum calculated in the first local extremum calculation step, and subtracting the correction values calculated in the first correction value calculation step from at least the samples preceding and following the sample of the local minimum calculated in the first local extremum calculation step;

a sampling frequency conversion step of converting the first digital audio signal with the waveform corrected in the first addition and subtraction step to a second digital audio signal having a second sampling frequency which is higher than the first sampling frequency;

a second local extremum calculation step of calculating samples of local maximum and minimum based on samples constituting the second digital audio signal;

a second number-of-sample detection step of detecting the number of samples between the adjacent samples of the local maximum and minimum in the samples constituting the second digital audio signal;

a second difference calculation step of calculating level differences between adjacent samples in the samples constituting the second digital audio signal;

a second correction value calculation step of calculating correction values by multiplying by a predetermined coefficient, the level differences calculated in the second difference calculation step; and a second addition and subtraction step of adding the correction values calculated in the second correction value calculation step, among the samples constituting the second digital audio signal, to at least the samples preceding and following the sample of the local maximum calculated in the second local extremum calculation step, and subtracting the correction values calculated in the second correction value calculation step from at least the samples preceding and following the sample of the local minimum calculated in the second local extremum calculation step.

4. A digital audio processing program stored in a non-transitory storage medium, causing a computer to execute:

a first local extremum calculation step of calculating samples of local maximum and minimum based on samples of a first digital audio signal having a first sampling frequency;

a first number-of-sample detection step of detecting the number of samples between the adjacent samples of the local maximum and minimum;

a first difference calculation step of calculating level differences between adjacent samples in the samples constituting the first digital audio signal;

a first correction value calculation step of calculating correction values by multiplying by a predetermined coefficient the differences calculated in the first difference calculation step;

a first addition and subtraction step of adding the correction values calculated in the first correction value calculation step, among the samples constituting the first digital audio signal, to at least the samples preceding and following the sample of the local maximum calculated in the first local extremum calculation step, and subtracting the correction values calculated in the first correction value calculation step from at least the samples preceding and following the sample of the local minimum calculated in the first local extremum calculation step;

a sampling frequency conversion step of converting the first digital audio signal with the waveform corrected in the first addition and subtraction step to a second digital audio signal having a second sampling frequency which is higher than the first sampling frequency;

a second local extremum calculation step of calculating samples of local maximum and minimum based on samples constituting the second digital audio signal;

a second number-of-sample detection step of detecting the number of samples between the adjacent samples of the local maximum and minimum in the samples constituting the second digital audio signal;

a second difference calculation step of calculating level differences between adjacent samples in the samples constituting the second digital audio signal;

a second correction value calculation step of calculating correction values by multiplying by a predetermined coefficient, the level differences calculated in the second difference calculation step; and a second addition and subtraction step of adding the correction values calculated in the second correction value calculation step, among the samples constituting the second digital audio signal, to at least the samples preceding and following the sample of the local maximum calculated in the second local extremum calculation step, and subtracting the correction values calculated in the second correction value calculation step from at least the samples preceding and following the sample of the local minimum calculated in the second local extremum calculation step.

5. A digital audio processing apparatus, which is configured, as a target digital audio signal, to process a digital audio signal obtained by converting a first digital audio signal having a first sampling frequency to a second digital audio signal having a second sampling frequency that is higher than the first sampling frequency, the apparatus comprising:

a first waveform correction processor configured to correct the waveform of the target digital audio signal; and a second waveform correction processor configured to correct the waveform of the target digital audio signal with the waveform corrected by the first waveform correction processor, wherein the first waveform correction processor comprises:

a first local extremum calculator configured, to extract samples taken at sample intervals of the first digital audio signal from samples constituting the target digital audio signal, and to calculate samples of local maximum and minimum based on the extracted samples;

a first number-of-sample detector configured to detect the number of samples between the samples of the local maximum and minimum adjacent to each other;

a first difference calculator configured to calculate level differences between adjacent samples in the samples constituting the target digital audio signal;

a first correction value calculator configured to calculate correction values by multiplying by a predetermined coefficient, the level differences calculated by the first difference calculator; and a first adder/subtractor configured to add the correction values calculated by the first correction value calculator, among the samples constituting the target digital audio signal, to at least the samples from the sample preceding the sample of the local maximum calculated by the first local extremum calculator to the sample which precedes the sample of the local maximum and is separated from the sample of the local maximum by a one sample interval of the first digital audio signal and the samples from the sample following the sample of the local maximum calculated by the first local extremum calculator to the sample which follows the sample of the local maximum and is separated from the sample of the local maximum by a one sample interval of the first digital audio signal, and to subtract the correction values calculated by the first correction value calculator from at least the samples from the sample preceding the sample of the local minimum calculated by the first local extremum calculator to the sample which precedes the sample of the local minimum and is separated from the local minimum by a one sample interval of the first digital audio signal and the samples from the sample following the sample of the local minimum calculated by the first local extremum calculator to the sample which follows the sample of the local minimum and is separated from the sample of the local minimum by a one sample interval of the first digital audio signal, the second waveform correction processor comprises:

a second local extremum calculator configured to calculate samples of local maximum and minimum based on samples constituting the target digital audio signal outputted from the first waveform correction processor;

a second number-of-sample detector configured to detect the number of samples between the samples of the local maximum and minimum adjacent to each other;

a second difference calculator configured to calculate level differences between adjacent samples in the samples constituting the target digital audio signal;

a second correction value calculator configured to calculate correction values by multiplying by a predetermined coefficient, the level differences calculated by the second difference calculator; and a second adder/subtractor configured, to add the correction values calculated by the second correction value calculator, among the samples constituting the target digital audio signal, to at least the samples preceding and following the sample of the local maximum calculated by the second local extremum calculator, and to subtract the correction values calculated by the second correction value calculator from at least the samples preceding and following the sample of the local minimum calculated by the second local extremum calculator.

6. The digital audio processing apparatus according to claim 5, wherein the first adder/subtractor when the number of samples detected by the first number-of-sample detector is within a first range, adds the correction values calculated by the first correction value calculator to the samples from the sample preceding the sample of the local maximum calculated by the first local extremum calculator to the sample which precedes the sample of the local maximum and is separated from the sample of the local maximum by a one sample interval of the first digital audio signal and the samples from the sample following the sample of the local maximum calculated by the first local extremum calculator to the sample which follows the sample of the local maximum and is separated from the sample of the local maximum by a one sample interval of the first digital audio signal, and subtracts the correction values calculated by the first correction value calculator from the samples from the sample preceding the sample of the local minimum calculated by the first local extremum calculator to the sample which precedes the sample of the local minimum and is separated from the local minimum by a one sample interval of the first digital audio signal and the samples from the sample following the sample of the local minimum calculated by the first local extremum calculator to the sample which follows the sample of the local minimum and is separated from the sample of the local minimum by a one sample interval of the first digital audio signal, and when the number of samples detected by the first number-of-sample detector is within a second range in which numbers of samples are larger than those of the first range, adds the correction values calculated by the first correction value calculator to the samples from the sample preceding the sample of the local maximum calculated by the first local extremum calculator to the sample which precedes the sample of the local maximum and is separated from the sample of the local maximum by a one sample interval of the first digital audio signal, the samples from the sample following the sample of the local maximum calculated by the first local extremum calculator to the sample which follows the sample of the local maximum and is separated from the sample of the local maximum by a one sample interval of the first digital audio signal, the samples from the sample which precedes the sample of the local maximum and is separated from the sample of the local maximum by a one sample interval of the first digital audio signal to the sample which precedes the sample of the local maximum and is separated from the sample of the local maximum by two sample intervals of the first digital audio signal, and the samples from the sample which follows the sample of the local maximum and is separated from the sample of the local maximum by a one sample interval of the first digital audio signal to the sample which follows the sample of the local maximum and is separated from the sample of the local maximum by two sample intervals of the first digital audio signal, and subtracts the correction values calculated by the first correction value calculator from the samples from the sample preceding the sample of the local minimum calculated by the first local extremum calculator to the sample which precedes the sample of the local minimum and is separated from the sample of the local minimum by a one sample interval of the first digital audio signal, the samples from the sample following the sample of the local minimum calculated by the first local extremum calculator to the sample which follows the sample of the local minimum and is separated from the sample of the local minimum by a one sample interval of the first digital audio signal, the samples from the sample which precedes the sample of the local minimum and is separated from the sample of the local minimum by a one sample interval of the first digital audio signal to the sample which precedes the sample of the local minimum and is separated from the sample of the local minimum by two sample intervals of the first digital audio signal, and the samples from the sample which follows the sample of the local minimum and is separated from the sample of the local minimum by a one sample interval of the first digital audio signal to the sample which follows the sample of the local minimum and is separated from the sample of the local minimum by two sample intervals of the first digital audio signal, the second adder/subtractor when the number of samples detected by the second number-of-sample detector is within the first range, adds the correction values calculated by the second correction value calculator to the samples preceding and following the sample of the local maximum calculated by the second local extremum calculator and subtracts the correction values calculated by the second correction value calculator from the samples preceding and following the sample of the local minimum calculated by the second local extremum calculator, and when the number of samples detected by the second number-of-sample detector is within the second range, adds the correction values calculated by the second correction value calculator to the two consecutive samples preceding and following the sample of the local maximum calculated by the second local extremum calculator and subtracts the correction values calculated by the second correction value calculator from the two consecutive samples preceding and following the sample of the local minimum calculated by the second local extremum calculator.

7. The digital audio processing apparatus according to claim 5, wherein the second sampling frequency is N times the first sampling frequency where N is a natural number not less than 2, and the first local extremum calculator extracts a sample every N samples from the samples constituting the target digital audio signal.

8. A digital audio processing method, which is configured, as a target digital audio signal, to process a digital audio signal obtained by converting a first digital audio signal having a first sampling frequency to a second digital audio signal having a second sampling frequency that is higher than the first sampling frequency, the method comprising:

an extraction step of extracting samples at sample intervals of the first digital audio signal from samples constituting the target digital audio signal;

a first local extremum calculation step of calculating samples of local maximum and minimum based on the samples extracted in the extraction step;

a first number-of-sample detection step of detecting the number of samples between the samples of the local maximum and minimum adjacent to each other;

a first difference calculation step of calculating level differences between adjacent samples in the samples constituting the target digital audio signal;

a first correction value calculation step of calculating correction values by multiplying by a predetermined coefficient the level differences calculated in the first difference calculation step;

a first addition and subtraction step of adding the correction values calculated in the first correction value calculation step, among the samples constituting the target digital audio signal, to at least the samples from the sample preceding the sample of the local maximum calculated in the first local extremum calculation step to the sample which precedes the sample of the local maximum and is separated from the sample of the local maximum by a one sample interval of the first digital audio signal and the samples from the sample following the sample of the local maximum calculated in the first local extremum calculation step to the sample which follows the sample of the local maximum and is separated from the sample of the local maximum by a one sample interval of the first digital audio signal, and to subtract the correction values calculated in the first correction value calculation step from at least the samples from the sample preceding the sample of the local minimum calculated in the first local extremum calculation step to the sample which precedes the sample of the local minimum and is separated from the local minimum by a one sample interval of the first digital audio signal and the samples from the sample following the sample of the local minimum calculated in the first local extremum calculation step to the sample which follows the sample of the local minimum and is separated from the sample of the local minimum by a one sample interval of the first digital audio signal;

a second local extremum calculation step of calculating samples of local maximum and minimum based on samples constituting the target digital audio signal subjected to addition and subtraction in the first addition and subtraction step;

a second number-of-sample detection step of detecting the number of samples between the samples of the local maximum and minimum adjacent to each other;

a second difference calculation step of calculating level differences between adjacent samples in the samples constituting the target digital audio signal;

a second correction value calculation step of calculating correction values by multiplying by a predetermined coefficient, the differences calculated in the second difference calculation step; and a second addition and subtraction step of adding the correction values calculated in the second correction value calculation step, among the samples constituting the target digital audio signal, to at least the samples preceding and following the sample of the local maximum calculated in the second local extremum calculation step and subtracting the correction values calculated in the second correction value calculation step from at least the samples preceding and following the sample of the local minimum calculated in the second local extremum calculation step.

9. A digital audio processing program stored in a non-transitory storage medium, which is configured to process, as a target digital audio signal, a digital audio signal obtained by converting a first digital audio signal having a first sampling frequency to a second digital audio signal having a second sampling frequency that is higher than the first sampling frequency, the program causing a computer to execute:

an extraction step of extracting samples at sample intervals of the first digital audio signal from samples constituting the target digital audio signal;

a first local extremum calculation step of calculating samples of local maximum and minimum based on the samples extracted in the extraction step;

a first number-of-sample detection step of detecting the number of samples between the samples of the local maximum and minimum adjacent to each other;

a first difference calculation step of calculating level differences between adjacent samples in the samples constituting the target digital audio signal;

a first correction value calculation step of calculating correction values by multiplying by a predetermined coefficient, the level differences calculated in the first difference calculation step;

a first addition and subtraction step of adding the correction values calculated in the first correction value calculation step, among the samples constituting the target digital audio signal, to at least the samples from the sample preceding the sample of the local maximum calculated in the first local extremum calculation step to the sample which precedes the sample of the local maximum and is separated from the sample of the local maximum by a one sample interval of the first digital audio signal and the samples from the sample following the sample of the local maximum calculated in the first local extremum calculation step to the sample which follows the sample of the local maximum and is separated from the sample of the local maximum by a one sample interval of the first digital audio signal, and to subtract the correction values calculated in the first correction value calculation step from at least the samples from the sample preceding the sample of the local minimum calculated in the first local extremum calculation step to the sample which precedes the sample of the local minimum and is separated from the local minimum by a one sample interval of the first digital audio signal and the samples from the sample following the sample of the local minimum calculated in the first local extremum calculation step to the sample which follows the sample of the local minimum and is separated from the sample of the local minimum by a one sample interval of the first digital audio signal;

a second local extremum calculation step of calculating samples of local maximum and minimum based on samples constituting the target digital audio signal subjected to addition and subtraction in the first addition and subtraction step;

a second number-of-sample detection step of detecting the number of samples between the samples of the local maximum and minimum adjacent to each other;

a second difference calculation step of calculating level differences between adjacent samples in the samples constituting the target digital audio signal;

a second correction value calculation step of calculating correction values by multiplying by a predetermined coefficient, the differences calculated in the second difference calculation step; and a second addition and subtraction step of adding the correction values calculated in the second correction value calculation step, among the samples constituting the target digital audio signal, to at least the samples preceding and following the sample of the local maximum calculated in the second local extremum calculation step and subtracting the correction values calculated in the second correction value calculation step from at least the samples preceding and following the sample of the local minimum calculated in the second local extremum calculation step.

* * * * *